United States Patent
Rahnama

(10) Patent No.: US 12,169,943 B2
(45) Date of Patent: Dec. 17, 2024

(54) STEREO DEPTH ESTIMATION

(71) Applicant: Five AI Limited, Bristol (GB)

(72) Inventor: Oscar Rahnama, Oxford (GB)

(73) Assignee: Five AI Limited, Cambridge (GB)

( * ) Notice: Subject to any disclaimer, the term of this patent is extended or adjusted under 35 U.S.C. 154(b) by 1040 days.

(21) Appl. No.: 17/052,630

(22) PCT Filed: May 3, 2019

(86) PCT No.: PCT/EP2019/061426
§ 371 (c)(1),
(2) Date: Nov. 3, 2020

(87) PCT Pub. No.: WO2019/211459
PCT Pub. Date: Nov. 7, 2019

(65) Prior Publication Data
US 2022/0230341 A1   Jul. 21, 2022

(30) Foreign Application Priority Data

May 4, 2018   (GB) ..................................... 1807392
May 25, 2018  (GB) ..................................... 1808637

(51) Int. Cl.
*G06K 9/00*   (2022.01)
*G06T 7/593*  (2017.01)
*H04N 13/00*  (2018.01)

(52) U.S. Cl.
CPC ...... *G06T 7/593* (2017.01); *H04N 2013/0081* (2013.01)

(58) Field of Classification Search
CPC ... G06T 7/32; G06T 7/55; G06T 2207/10028; G06T 7/593; G06T 15/20; G06T 5/50;
(Continued)

(56) References Cited

U.S. PATENT DOCUMENTS

| | | | |
|---|---|---|---|
| 9,756,312 B2 | 9/2017 | Akin et al. | |
| 2011/0210851 A1 | 9/2011 | Woodfill et al. | |
| 2015/0319419 A1* | 11/2015 | Akin ........................ | G06T 7/97 |
| | | | 348/49 |

OTHER PUBLICATIONS

Facciolo, G., De Franchis, C., & Meinhardt, E. (2015). MGM: A significantly more global matching for stereovision. In BMVC 2015. (Year: 2015).*

(Continued)

*Primary Examiner* — Emily C Terrell
*Assistant Examiner* — Kevin M Coomber
(74) *Attorney, Agent, or Firm* — Andrew J. Tibbetts; Samuel S. Stone; Greenberg Traurig, LLP

(57) ABSTRACT

Depth information is extracted from a stereoscopic image pair by an image processing system. For each pixel of a target image of the stereoscopic image pair, a final disparity cost vector is computed having cost components corresponding to different disparities. The final disparity cost vector is stored in association with that pixel. That pixel is assigned the disparity corresponding to the lowest cost component of the final disparity cost vector, wherein the extracted depth information comprises the disparities assigned to the pixels of the target image. For at least a subset of the pixels of the target image, the final disparity cost vector is computed for each of those pixels by computing, with respect to the reference image, a set of matching costs for that pixel and the different disparities, and combining the matching costs with the one or more final disparity cost vectors stored in association with one or more of the adjacent pixels of the target image.

19 Claims, 12 Drawing Sheets

(58) Field of Classification Search
CPC ........ G06T 2207/10012; H04N 13/106; H04N 13/128; H04N 13/111; H04N 2013/0081
See application file for complete search history.

(56) References Cited

OTHER PUBLICATIONS

Yang, R., Pollefeys, M., & Li, S. (Jun. 2004). Improved real-time stereo on commodity graphics hardware. In 2004 Conference on Computer Vision and Pattern Recognition Workshop (pp. 36-36). IEEE. (Year: 2004).*
Rahnama, O., Makarov, A., & Torr, P. (May 2017). Real-time depth processing for embedded platforms. In Real-Time Image and Video Processing 2017 (vol. 10223, pp. 176-186). SPIE. (Year: 2017).*
Banks et al., Quantitative evaluation of matching methods and validity measures for stereo vision. The International Journal of Robotics Research. Jul. 2001;20(7):512-32.
Banz et al., Real-time stereo vision system using semi-global matching disparity estimation: Architecture and FPGA-implementation. 2010 International Conference on Embedded Computer Systems: Architectures, Modeling and Simulation (SAMOS). Jul. 19, 2010:93-101.
Besse et al., Pmbp: Patchmatch belief propagation for correspondence field estimation. International Journal of Computer Vision. Oct. 1, 2014;110(1):2-13.
Cavallari et al., On-the-fly adaptation of regression forests for online camera relocalisation. Proceedings of the IEEE conference on computer vision and pattern recognition. 2017:4457-4466.
Chen et al., Fast MRF optimization with application to depth reconstruction. Proceedings of the IEEE conference on computer vision and pattern recognition. 2014:3914-3921.
Cocorullo et al., An efficient hardware-oriented stereo matching algorithm. Microprocessors and Microsystems. Oct. 1, 2016;46:21-33.
De-Maeztu et al., Linear stereo matching. 2011 International Conference on Computer Vision. Nov. 6, 2011:1708-1715.
Drory et al., Semi-global matching: a principled derivation in terms of message passing. German Conference on Pattern Recognition. Sep. 2, 2014:43-53.
Gehrig et al., A real-time low-power stereo vision engine using semi-global matching. International Conference on Computer Vision Systems. Oct. 13, 2009:134-143.
Geiger et al., Are we ready for autonomous driving? The KITTI Vision Benchmark Suite. 2012 IEEE Conference on Computer Vision and Pattern Recognition. Jun. 16, 2012:3354-3361.
Georgoulas et al., A real-time fuzzy hardware structure for disparity map computation. Journal of Real-Time Image Processing. Dec. 2011;6(4):257-73.
Godard et al., Unsupervised monocular depth estimation with left-right consistency. Proceedings of the IEEE Conference on Computer Vision and Pattern Recognition. 2017:270-279.
Golodetz et al., Collaborative large-scale dense 3d reconstruction with online inter-agent pose optimisation. IEEE transactions on visualization and computer graphics. Oct. 15, 2018;24(11):2895-905.
Hernandez-Juarez et al., Embedded real-time stereo estimation via semi-global matching on the GPU. Procedia Computer Science. Jan. 1, 2016;80:143-53.
Hicks et al., A depth-based head-mounted visual display to aid navigation in partially sighted individuals. PloS one. Jul. 3, 2013;8(7):e67695.
Hirschmüller et al., Evaluation of stereo matching costs on images with radiometric differences. IEEE transactions on pattern analysis and machine intelligence. Sep. 5, 2008;31(9):1582-99.
Hirschmüller, Semi-global matching-motivation, developments and applications. Photogrammetric Week 11. 2011:173-84.
Honegger et al., Real-time and low latency embedded computer vision hardware based on a combination of FPGA and mobile CPU.

2014 IEEE/RSJ International Conference on Intelligent Robots and Systems. Sep. 14, 2014:4930-4935.
Hosni et al., Secrets of adaptive support weight techniques for local stereo matching. Computer Vision and Image Understanding. Jun. 1, 2013;117(6):620-32.
Komodakis et al., Performance vs computational efficiency for optimizing single and dynamic MRFs: Setting the state of the art with primal-dual strategies. Computer Vision and Image Understanding. Oct. 1, 2008;112(1):14-29.
Kuzmin et al., End-to-end learning of cost-vol. aggregation for real-time dense stereo. 2017 IEEE 27th International Workshop on Machine Learning for Signal Processing (MLSP). Sep. 25, 2017:1-6.
Li et al., SoC and FPGA oriented high-quality stereo vision system. 2016 26th International Conference on Field Programmable Logic and Applications (FPL). 2016:1-4.
Liu et al., Learning depth from single monocular images using deep convolutional neural fields. IEEE transactions on pattern analysis and machine intelligence. Dec. 3, 2015;38(10):2024-39.
Mattoccia et al., A passive RGBD sensor for accurate and real-time depth sensing self-contained into an FPGA. Proceedings of the 9th International Conference on Distributed Smart Cameras. Sep. 8, 2015:146-151.
Menze et al., Joint 3d estimation of vehicles and scene flow. ISPRS annals of the photogrammetry, remote sensing and spatial information sciences. 2015;2:427.
Oleynikova et al., Reactive avoidance using embedded stereo vision for mav flight. 2015 IEEE International Conference on Robotics and Automation (ICRA). May 26, 2015:50-56.
PÉRez-Patricio et al., An FPGA stereo matching unit based on fuzzy logic. Microprocessors and Microsystems. May 1, 2016;42:87-99.
PÉRez-Patricio et al., FPGA implementation of an efficient similarity-based adaptive window algorithm for real-time stereo matching. Journal of Real-Time Image Processing. Apr. 2019;16(2):271-87.
Perri et al., Stereo vision architecture for heterogeneous systems-on-chip. Journal of Real-Time Image Processing. Apr. 2020;17(2):393-415.
Prisacariu et al., Infinitam v3: A framework for large-scale 3d reconstruction with loop closure. ArXiv preprint arXiv:1708.00783v1. Aug. 2, 2017:1-19.
Rehmann et al., Fast cost-volume filtering for visual correspondence and beyond. IEEE Transactions on Pattern Analysis and Machine Intelligence. Aug. 1, 2012;35(2):504-11.
Scharstein et al., A taxonomy and evaluation of dense two-frame stereo correspondence algorithms. International journal of computer vision (IJCV). Apr. 2002;47(1):7-42.
Scharstein et al., High-accuracy stereo depth maps using structured light. 2003 IEEE Computer Society Conference on Computer Vision and Pattern Recognition. Jun. 18, 2003;1:I-I.
Scharstein et al., High-resolution stereo datasets with subpixel-accurate ground truth. German conference on pattern recognition (GCPR). Sep. 2, 2014:31-42.
Schmid et al., Stereo vision and IMU based real-time ego-motion and depth image computation on a handheld device. 2013 IEEE International Conference on Robotics and Automation (ICRA). May 6, 2013:4671-4678.
Shan et al., Hardware acceleration for an accurate stereo vision system using mini-census adaptive support region. ACM Transactions on Embedded Computing Systems (TECS). Apr. 1, 2014;13(4s):1-24.
Shotton et al., Scene coordinate regression forests for camera relocalization in RGB-D images. Proceedings of the IEEE Conference on Computer Vision and Pattern Recognition (CVPR). 2013:2930-2937.
Sun et al., Stereo matching using belief propagation. IEEE Transactions on pattern analysis and machine intelligence. Jun. 20, 2003;25(7):787-800.
Tateno et al., Cnn-slam: Real-time dense monocular slam with learned depth prediction. Proceedings of the IEEE Conference on Computer Vision and Pattern Recognition (CVPR). 2017:6243-6252.
Ttofis et al., Towards accurate hardware stereo correspondence: A real-time FPGA implementation of a segmentation-based adaptive

(56) References Cited

OTHER PUBLICATIONS support weight algorithm. 2012 Design, Automation & Test in Europe Conference & Exhibition (Date). Mar. 12, 2012:703-708.
Wang et al., Real-time high-quality stereo vision system in FPGA. IEEE Transactions on Circuits and Systems for Video Technology. Jan. 30, 2015;25(10):1696-708.
Werner et al., Hardware implementation of a full HD real-time disparity estimation algorithm. IEEE transactions on consumer electronics. Apr. 2, 2014;60(1):66-73.
Zabih et al., Non-parametric local transforms for computing visual correspondence. European conference on computer vision (ECCV). May 2, 1994:151-158.
Zhang et al., Real-time high-definition stereo matching on FPGA. Proceedings of the 19th ACM/SIGDA international symposium on Field programmable gate arrays. Feb. 27, 2011:55-64.
Zhang, Microsoft kinect sensor and its effect. IEEE multimedia. Apr. 27, 2012;19(2):4-10.
International Search Report and Written Opinion for International Application No. PCT/EP2019/061426 mailed Aug. 2, 2019.
Facciolo et al., MGM: A significantly more global matching for stereovision. HAL archives ouvertes. Dec. 10, 2015:13 pages.
Hirschmuller, Stereo processing by semiglobal matching and mutual information. IEEE Transactions on pattern analysis and machine intelligence. Feb. 1, 2008;30(2):328-41.
Menze et al., Object scene flow for autonomous vehicles. Proceedings of the IEEE conference on computer vision and pattern recognition. 2015:3061-3070.
Rahnama et al., Real-time dense stereo matching with ELAS on FPGA-accelerated embedded devices. ArXiv preprint arXiv:1802.07210. Feb. 20, 2018;1:1-8.
Rahnama et al., Real-time depth processing for embedded platforms. Proc. SPIE 10223, Real-Time Image and Video Processing 2017. May 1, 2017:12 pages.

* cited by examiner

STEREO DEPTH ESTIMATION

RELATED APPLICATIONS

This application is a national stage filing under 35 U.S.C. § 371 of international application number PCT/EP2019/061426, filed May 3, 2019, which claims priority to British application number 1808637.1, filed May 25, 2018 and British application number 1807392.4, filed May 4, 2018.

TECHNICAL FIELD

This disclosure relates to stereo depth estimation, i.e. the extraction of depth information from a stereoscopic (stereo) image pair.

BACKGROUND

Numerous computer vision applications, including 3D voxel scene reconstruction, object recognition, 6D camera re-localisation, and autonomous navigation, either rely on, or can benefit from, the availability of depth to capture 3D scene structure.

For example, in the field of robotics, mobile robotic systems that can autonomously plan their paths in complex environments are becoming increasingly prevalent. An example of such a rapidly emerging technology is autonomous vehicles (AVs) that can navigate by themselves on urban roads. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

Active approaches for acquiring depth, based on structured light or LiDAR, produce high-quality results. However, the former performs poorly outdoors, where sunlight washes out the infrared patterns it uses, whereas the latter is generally expensive and power-hungry, whilst simultaneously only producing sparse depth.

Significant attention has thus been devoted to passive methods of obtaining dense depth from either monocular or stereo images. Although recent approaches based on deep learning have made progress in the area, monocular approaches, which only require a single camera, struggle in determining scale. Stereo approaches, as a result, are often preferred when multiple cameras can be used, with binocular stereo methods (which achieve a compromise between quality and cost) proving particularly popular.

In an AV or other robotic system, stereo vision can be the mechanism (or one of the mechanisms) by which the robotic system observes its surroundings in 3D. In the context of autonomous vehicles, this allows a planner of the AV to make safe and appropriate driving decisions in a given driving context. The AV may be equipped with one or multiple stereo camera pairs for this purpose.

FIG. 1 shows a highly schematic block diagram of an example image processing system 106 (depth estimator), which is shown to have inputs to receive, from a stereo image capture system 102, via an image rectifier 104, a stereo pair of left and right images denoted L and R respectively. A disparity map D, as extracted from the stereo image pair L,R, is shown to be provided by the depth estimator 106 as an output. The disparity map D assigns, to each pixel (i,j) of a "target" image of the stereo image pair, an estimated "disparity" $D_{ij}$. Here, the index i denotes pixel row (with i increasing from left to right) and index j denotes pixel column (with j increasing from top to bottom) In the present example, the target image is chosen as the left image L, hence each pixel of the left image L is assigned an estimated depth. The other image—in this case, the right image R—is used as a reference image. However, in general, either image can be the target image, with the other image being used as the reference image.

Some of the principles which underpin stereo vision are briefly outlined with reference to FIG. 2. The top part of FIG. 2 shows schematic views of the stereo image capture system 102, in which the z-axis of a Cartesian coordinate system is defined as lying parallel to the optical axis of the camera which captures the target image (the left camera 102L in the present example). The left-hand side shows a plan view (in the x-z plane) of left and right optical sensors (cameras) 102L, 102R, which are shown to be horizontally separated (i.e., in the x direction) from each other by a distance b (the baseline). The right-hand side shows a side-on view (in the x-y plane) in which only the left camera 102L is visible due to the fact that the cameras 102L, 102R are substantially aligned in the vertical (y) direction. It is noted that, in the present context, the terms vertical and horizontal are defined in the frame of reference of the stereo image capture system, i.e. vertical means the direction in which the cameras 102L, 102R are aligned and left and right refer to the two directions along the x-axis as defined above (irrespective of the direction of gravity).

By way of example, pixel (i,j) in the left image L and pixel (i',j) in the right image R are shown to correspond to each other in that they each correspond to substantially the same real-world scene point P. Reference numeral 200 denotes the image plane of the captured images L, R in which the image pixels are considered to lie. Due to the horizontal offset between the cameras 102L, 102R, those pixels in the left and right images exhibit a relative "disparity", as illustrated in the lower part of FIG. 2. The lower part of FIG. 2 shows a schematic representation of rectified left and right images L, R as captured by the cameras 102L, 102R and the disparity map D extracted from those images. The disparity associated with pixel (i,j) in the target image L means the offset between that pixel and the corresponding pixel (i',j) in the reference image R, which is caused by the separation of the cameras 102L, 102R and depends on the depth (distance from the camera 102L along the z axis) of the corresponding scene point P in the real-world.

Thus, pixel depth can be estimated by searching for matching pixels between the left and right images L,R of a stereo image pair and measuring the disparity between them. The search for matching pixels can be simplified by an inherent geometric constraint, namely that, given a pixel in the target image L, any corresponding pixel in the reference image R will be appear in the reference image on a known "epipolar line". For an ideal stereoscopic system with vertically-aligned image capture units, the epipolar lines are all horizontal such that, given any pixel (i,j) in the target image L, the corresponding pixel (assuming it exists) will be vertically aligned i.e. located in the reference image R in the same pixel row (j) as the pixel (i,j) in the target image L. This may not be the case in practice because perfect alignment of the stereo cameras is unlikely. However, image rectification is applied to the images L,R, by the image rectifier 104, to account for any misalignment and thereby ensure that corresponding pixels are always vertically aligned in the images. Hence, in FIG. 1, the depth estimator 106 is shown to receive, from the image rectifier 104, rectified versions of the left and right images L,R from which the disparity map D may be extracted.

In the present example, it is assumed that, in the pixel-matching search, pixel (i,j) in the target image L is correctly found to match pixel (i',j) in the reference image R. Hence, the disparity assigned to pixel (i,j) in the target image L is $$D(p)=D_{ij}=i-i',$$

where pixel (i,j) is denoted in mathematical notation as $p=[i,j]^T$. In this manner, a disparity is assigned to each pixel of the target image for which a matching pixel can be found in the reference image (this will not necessarily be all of the pixels in the target image L: there may for example exist a region of pixels at one edge of the target image which are outside of the field of view of the other camera and thus have no corresponding pixels in the reference image; the search may also fail to find a match e.g. because the corresponding scene point is occluded in the reference image, or depth values may be pruned if they do not meet certain criteria. Repeating patterns or textureless regions in the images may also cause false matches).

The depth of each such target image pixel is thus computed initially in disparity space. Each disparity can, in turn, be converted, as needed, into units of distance using knowledge of the camera intrinsics (focal length f and baseline b) as:

$$d_{ij} = \frac{bf}{D_{ij}}$$

where $d_{ij}$ is the estimated depth of pixel (i,j) in the target image L in units of distance, i.e. the distance between the camera 102L which captured the target image L and the corresponding real-world point P along the optical axis of the stereo camera system 102 (z-axis).

Many binocular stereo methods find correspondences between two such images and use them to estimate disparity. This is typically split into four sequential phases: (a) matching cost computation, (b) cost aggregation, (c) disparity optimisation, and (d) disparity refinement. At a high level, such methods can be classified into two categories, based on the subset of steps mentioned above that they focus on performing effectively, and the amount of information used to estimate the disparity for each pixel:

1. Local methods focus on steps (a) and (b), finding correspondences between pixels in the left and right images by matching simple, window-based features across the disparity range. Whilst fast and computationally cheap, they suffer in textureless/repetitive areas, and can easily estimate incorrect disparities.
2. Global methods, by contrast, are better suited to estimating accurate depths in such areas, since they enforce smoothness over disparities via the (possibly approximate) minimisation of an energy function defined over the whole image (they focus on steps (c) and (d)). However, this increased accuracy tends to come at a high computational cost, making these methods unsuitable for real-time applications.

So-called "Semi-global matching" (SGM) bridges the gap between local and global methods: by approximating the global methods' image-wide smoothness constraint with the sum of several directional minimisations over the disparity range (usually 8 or 16 directions, in a star-shaped pattern), it produces reasonable depth in a fraction of the time taken by global methods. SGM has thus proved highly popular in real-world systems.

Further details of SGM may be found in H. Hirschmuller. Stereo Processing by Semi-Global Matching and Mutual Information, T-PAMI, 30(2):328-341, 2008, which is incorporated herein by reference in its entirety.

However, SGM have various drawbacks. Because the disparities that SGM computes for neighbouring pixels are based on star-shaped sets of input pixels that are mostly disjoint, SGM suffers from "streaking" in areas in which the data terms in some directions are weak, whilst those in other directions are strong. This streaking effect can result in a significant loss of accuracy in the disparity map when applied to certain types of image. Recently, this problem has been partially addressed by an approach called More Global Matching (MGM), which incorporates information from two directions into each of SGM's directional minimisations.

Further details of MGM may be found in G. Facciolo, C. de Franchis, and E. Meinhardt. MGM: A Significantly More Global Matching for Stereovision, in BMVC, 2015, which is incorporated herein by reference in its entirety.

SUMMARY

Whilst MGM is generally effective in overcoming some of the underlying issues with SGM, MGM cannot be applied straightforwardly in an embedded context. This is because it requires multiple passes over the pixels in the input images, several of them in non-raster order, to compute bi-directional energies to be minimised.

The present disclosure provides a stereo depth estimation algorithm which expands on and leverages some of the key ideas introduced in MGM to provide a method that attains competitive levels of accuracy but which, in contrast to MGM, is much more amenable to a real-time FGPA (Field Programmable Gate Array) or other embedded implementation. In a practical context, this translates to a similar level of accuracy but achieved with greater speed and much lower power consumption.

When implemented on a raster-like, in-stream processing platform, such as an FPGA, there are particular benefits of both increased speed and improved memory efficiency.

It is however noted that, whilst the present algorithm is particularly well-suited to a low-power FPGA/embedded implementation, the subject matter is not limited in this respect. The algorithm may also be implemented in software (i.e. executable computer instructions) on a general-purpose processing platform (e.g. CPU and/or GPU/accelerator-based platform).

An image processing system configured to implement the present algorithm can thus take the form of a FPGA, Application Specific Integrated Circuit (ASIC) or other embedded device, but can also take the form of a general-purpose processor on which the algorithm is implemented in software.

A first aspect of the present invention provides a method of extracting depth information from a stereoscopic image pair, the method comprising implementing, by an image processing system, the following steps:

receiving at the image processing system the stereoscopic image pair, formed of a target image and an associated reference image; and for each pixel of the target image, computing a final disparity cost vector having cost components corresponding to different disparities, storing the final disparity cost vector in association with that pixel, and assigning to that pixel the disparity corresponding to the lowest cost component of the final disparity cost vector, wherein the extracted depth information comprises the disparities assigned to the pixels of the target image;

wherein, for at least a subset of the pixels of the target image, the final disparity cost vector is computed for each of those pixels by computing, with respect to the reference image, a set of matching costs for that pixel and the different disparities, and combining the matching costs with the one or more final disparity cost vectors stored in association with one or more of the adjacent pixels of the target image.

Herein, a "final" disparity cost vector means a cost vector that is actually optimized in order to assign a disparity to a given pixel. This in contrast to what are referred to herein as "intermediate" cost vectors of the kind used in SGM and MGM, which the present disclosure has recognized as a significant source of inefficiency in those algorithms.

In MGM, intermediate cost vectors arise as a consequence of the multiple bi-directional minimisations of MGM. The described embodiments of the invention effectively replace the multiple bi-directional minimisations of MGM, some of which cannot be computed in raster order, with a single minimisation of a final disparity cost vector. This is preferably a four-directional minimization based only on pixels that are available when processing the image as a stream. This allows each image to be processed in raster order and in a single pass, allowing data to be streamed directly from a camera connected to the image processing system and disparity values to be outputted without requiring an intermediate buffering stage (such that the disparity values are provided for initial pixels of a current image as an output stream whilst later pixels of that image are still being received as an input stream). This simplifies the system architecture and reduces latency. Further explanation is provided in the detailed description below.

In embodiments of the invention, the pixels of the images may be received at the image processing system as respective streams of pixels, and the final disparity cost vector may be computed for each of the pixels independently of the final disparity cost vector of any subsequent pixel in the stream of target image pixels.

The final disparity cost vector may be computed for each of the subset of pixels from the final disparity cost vectors computed for all of the adjacent pixels that precede that pixel in the stream of target image pixels. For example, the pixels may be streamed in raster order, such that four adjacent pixels precede that pixel in the stream of target image pixels.

As the streams of pixels are received, the final disparity cost vectors may be computed and the disparities may be assigned to the pixels of the target image dynamically, so as to provide the assigned disparities in an output stream that is outputted from the image processing system as the streams of pixels are still being received thereat.

The matching costs may be combined with the at least two final disparity cost vectors stored in association with at least two of the adjacent pixels of the target image, the at least two final disparity cost vectors being aggregated and combined with the matching costs. For example, in the above streaming context, the final disparity cost vectors for all of the pixels which precede the pixel in the stream of target image pixels may be aggregated and combined with the matching costs for that pixel.

In the examples below, the at least two final disparity cost vectors are aggregated in an aggregate cost term, which is combined with the matching costs.

For each pixel p of the subset of pixels of the target image, the matching cost $C_p(d)$ for pixel p and each disparity d of the different disparities D may be combined with:

$$\min_{d' \in \mathcal{D}} (L(p-x, d') + V(d, d')),$$

in which p−x means the pixel adjacent pixel p in the target image for direction x∈X, L(p−x, d) means the cost component for disparity d of the final disparity cost vector for pixel p−x and V (d, d') is a penalty term that selectively penalizes changes in disparity, and X is a set of one or more direction vectors. For example, each cost component L(p, d) of the final disparity cost vector for pixel p may be computed as:

$$L(p, d) = C_p(d) + \frac{1}{|X|} \sum_{x \in X} \left( \min_{d' \in \mathcal{D}} (L(p-x, d') + V(d, d')) - \min_{d' \in \mathcal{D}} (L(p-x, d')) \right).$$

The above is an example of an aggregate cost term of the kind mentioned above. When the pixels are received as streams as above, every direction x∈X may be such that pixel p−x has been received before pixel p. For example, X may contain four directions corresponding to the four preceding adjacent pixels mentioned above.

For example, X may be chosen such that the such that the summation $\Sigma_{x \in X}(\bullet)$ is over all of the adjacent pixels which precede p in the stream of target image pixels, i.e. such that the set {p−x|x∈X} contains all adjacent pixels which precede p in the stream of target image pixels.

For example, in the case that the pixels are streamed in raster order, X may contain four directions such that the summation $\Sigma_{x \in X}(\bullet)$ is over the four preceding adjacent pixels.

The final disparity cost vector may be computed for a current pixel of the subset of pixels from the final disparity cost vector for at least one pixel adjacent the current pixel in an adjacent scan line of the target image, the final disparity cost vector for that adjacent pixel being accessed from a window buffer in which it is stored.

The window buffer is in the form of a set of registers or flip-flops or one or more look up tables (LUTs).

The final disparity cost vectors for the pixels between the current pixel and the adjacent pixel in the adjacent scan line may be stored in a line buffer, and once the final disparity cost vector for the current pixel has been computed:

one of the final disparity cost vectors in the line buffer may be moved to the window buffer for use in computing the final disparity cost vector for the next pixel in the subset of pixels, and the final disparity cost vector for the current pixel may be stored in the line buffer.

The line buffer may be a dual-port memory block, wherein said one of the final disparity cost vectors may be moved using one of the ports, and the final disparity cost vector for the current pixel may be stored in the line buffer using the other port. The memory block may for example comprise random access memory (RAM).

The final disparity cost vector may be computed from the final disparity cost vectors for multiple pixels adjacent the current pixel in the adjacent scan line, which may be accessed from the window buffer in which they are stored, and said one of the final disparity cost vectors may be moved to the window buffer once the final disparity cost vector for the current pixel has been computed.

The final disparity cost vector for the current pixel may be computed from the final disparity cost vector of at least one adjacent pixel in the same scan line, which is accessed from the window buffer in which it is stored.

Once the final disparity cost vector for the current pixel has been computed, a copy may also stored in the window buffer for use in computing the final disparity cost vector for the next pixel in the subset of pixels.

The window buffer may comprise a set of three shifting buffers for storing the final disparity cost vectors of three adjacent pixels in the adjacent scan line, and an additional buffer for storing the final disparity cost vector of the adjacent pixel in the same scan line.

The set of matching costs may be computed for the current pixel by computing a feature vector for the current pixel and comparing it with a set of pixel feature vectors for the reference image, held in a feature vector buffer, for the pixels of the reference image having the different disparities relative to the current pixel of the target image, and it may be that, once the final disparity cost vector has been computed for the current pixel:

a feature vector for the next pixel of the target image is computed,
the feature vector for the pixel of the reference image having a disparity greater than the maximum of the disparities relative to the next pixel is discarded from the feature vector buffer,
a feature vector for the pixel of the reference image having a minimum of the disparities relative to the next pixel of the target image is computed and stored in the feature vector buffer, for use in computing the set of matching costs for the next pixel in the target image.

The minimum disparity may be zero disparity.

The term V(d, d') above may be defined as:

$$V(d, d') = \begin{cases} 0 & \text{if } d = d' \\ P_1 & \text{if } |d - d'| = 1 \\ P_2 & \text{otherwise} \end{cases}.$$

The term $$\min_{d' \in \mathcal{D}} (L(p - x, d') + V(d, d'))$$

may be computed for each disparity $d \in D$ as $$\min\{L(p-x, d), L(p-x, d-1) + P_1, L(p-x, d+1) + P_1,$$

$$\min_{d' \in \mathcal{D}} (L(p-x, d') + P_2)\} - \min_{d' \in \mathcal{D}} (L(p-x, d')),$$

wherein $$\min_{d' \in \mathcal{D}} (L(p-x, d'))$$

may be computed once and stored for use in computing $$\min_{d' \in \mathcal{D}} (L(p - x, d') + V(d, d'))$$

for each disparity $d \in D$.

Another aspect provides a method of extracting depth information from a left-right stereoscopic image pair, in which the steps of any of the preceding claims are applied in parallel with the left image as the target image and the right image as the reference image to assign disparities to pixels of the left image, and with the right image as the target image and the left image as the reference image to assign disparities to pixels of the right image.

The method may comprise a disparity check, in which the disparities assigned to the left image are compared with the corresponding disparities assigned to the right image.

The pixels of the images may be received in scan lines and the steps may be implemented in parallel with a pixel offset in the direction of the scan lines, the pixel offset corresponding to a maximum assignable disparity.

Another aspect of the invention provides an image processing system comprising an image input configured to receive a stereoscopic image pair; and image processing apparatus configured to implement the method of any preceding claim.

The image processing apparatus may be in the form of a field programmable gate array.

Another aspect provides a computer-readable storage medium having stored thereon circuit description code for configuring a field programmable gate array to implement the method of any preceding method claim.

The circuit description code may be register-transfer level (RTL) code.

Another aspect provides a computer program product comprising executable instructions stored on an electronic storage medium and configured, when executed on an image processing apparatus, to implement the method of any preceding method claim.

Another aspect provides an autonomous vehicle comprising the above image processing system and an autonomous vehicle control system coupled to the image processing system, which is configured to control the motion of the autonomous vehicle based on depth information extracted by the image processing system.

The autonomous vehicle may comprise a power source (such as an engine or battery) and a drive mechanism, each coupled to the autonomous vehicle control system, and wheels coupled to the drive mechanism, wherein the autonomous vehicle control system is configured to control the wheels, via the drive mechanism, and the engine based on the extracted depth information.

BRIEF DESCRIPTION OF FIGURES

For a better understanding of the present subject matter, and to show how embodiments of the same may be carried into effect, reference is made to the following figures in which.

DETAILED DESCRIPTION

1. Overview

Although many popular methods of stereo depth estimation strive solely for depth quality, for real-time mobile applications (e.g. prosthetic glasses or micro-UAVs or any other mobile robotic system where power is limited), speed and power efficiency are equally, if not more, important. Many real-world systems rely on Semi-Global Matching (SGM) to achieve a good balance between accuracy and speed, but power efficiency is difficult to achieve with conventional hardware, making the use of embedded devices such as FPGAs attractive for low-power applications.

As indicated, the full SGM algorithm is ill-suited to deployment on FPGAs, and so most FPGA variants of it are partial, at the expense of accuracy.

Moreover, as indicated, in a non-FPGA context, the accuracy of SGM has been improved by More Global Matching (MGM), which also helps tackle the streaking artifacts that afflict SGM.

The described embodiments of the invention provide a novel, resource-efficient method that builds on MGM's techniques for improving depth quality to provide an improved depth extraction algorithm that retains the benefits of MGM but which may be run in real time on a low-power FPGA. Through evaluation on multiple datasets (KITTI and Middlebury), it is demonstrated that, in comparison to other real-time capable stereo approaches, the described algorithm can achieve a state-of-the-art balance between accuracy, power efficiency and speed, making this approach particularly desirable for use in real-time systems with limited power.

First, there follows a more in-depth description of certain aspects of SGM and MGM which provide relevant context to the described embodiments.

Figure 1:
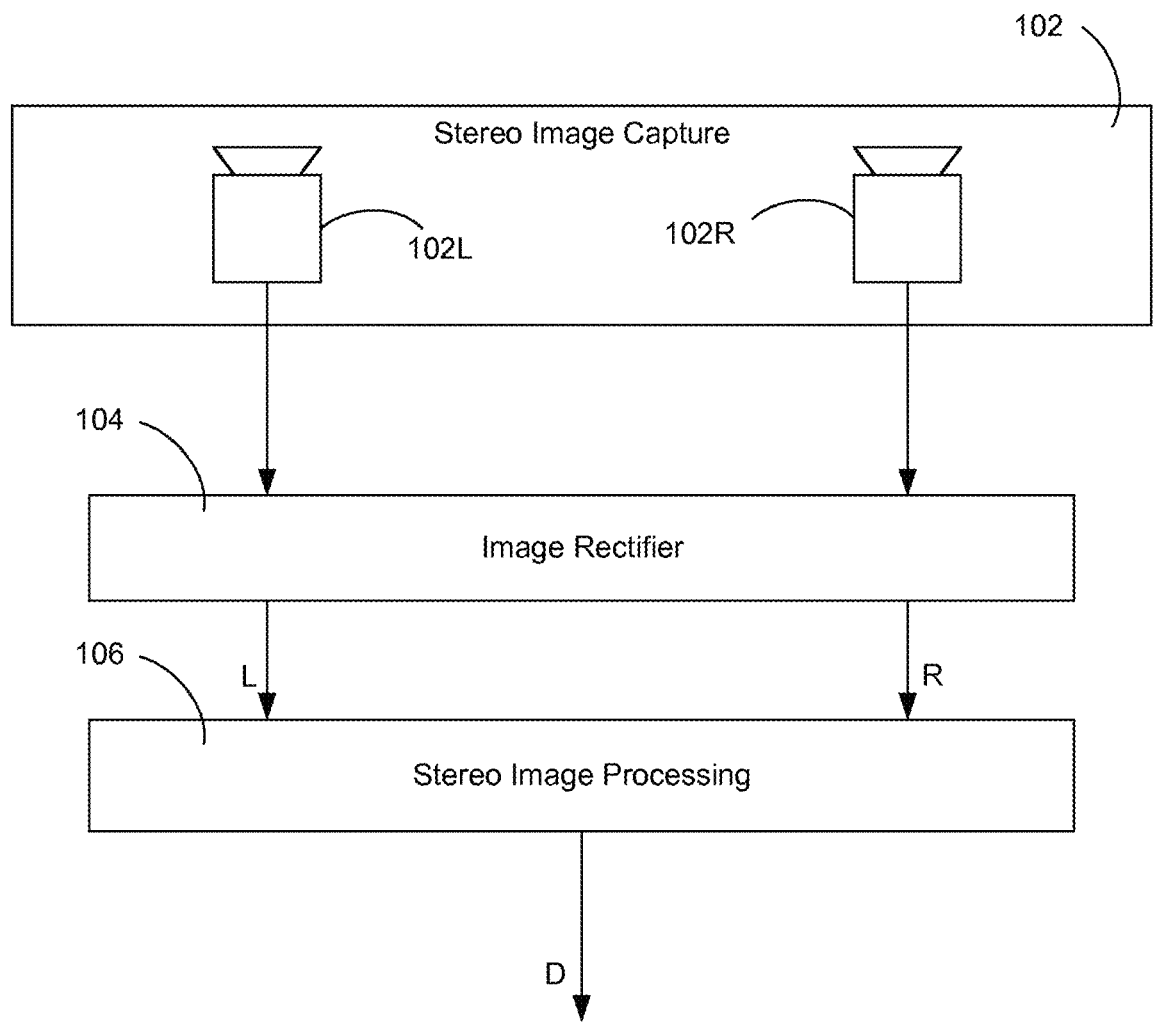
FIG. 1 shows a schematic block diagram of an image processing system.
Figure 2:
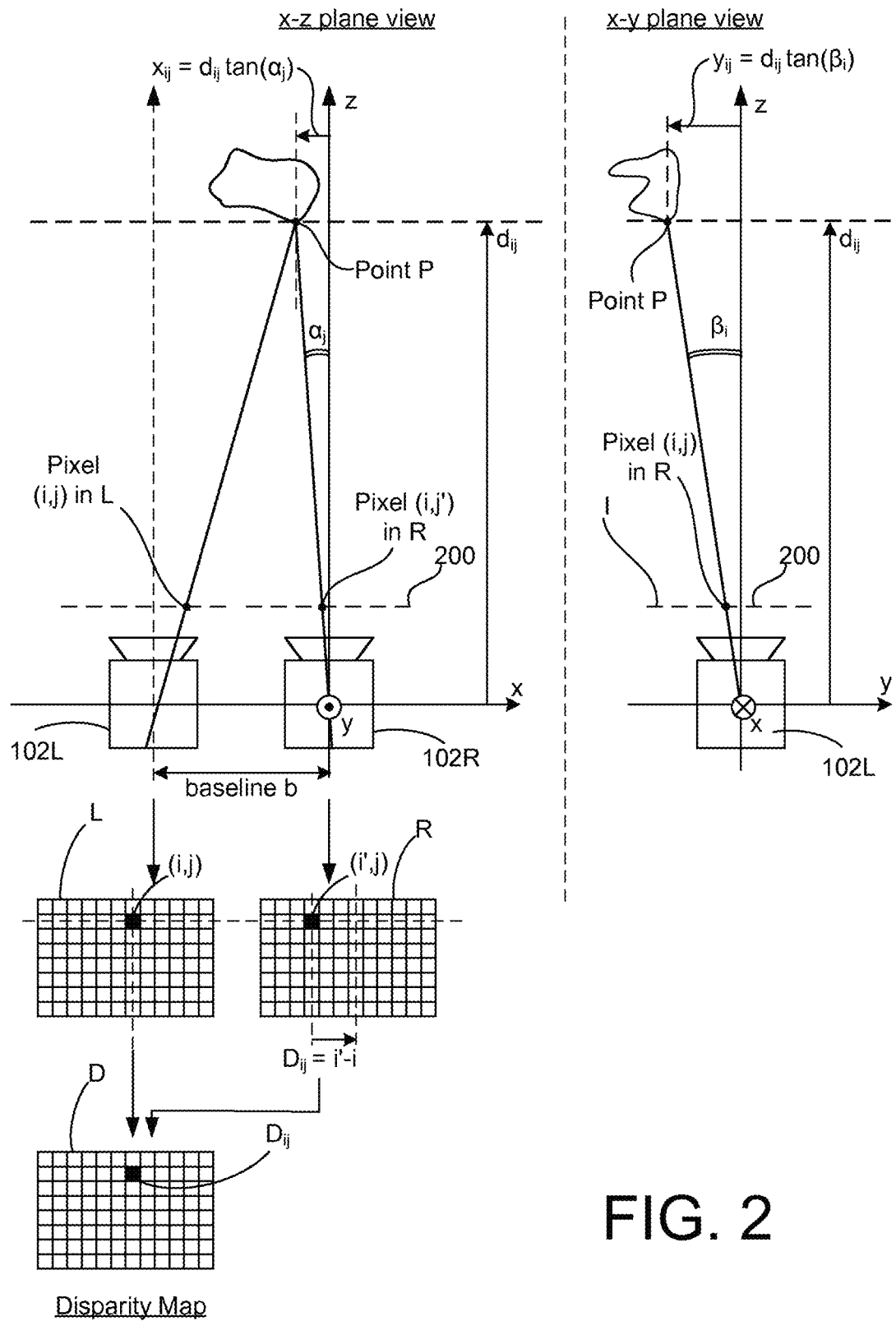
FIG. 2 shows a schematic illustration of certain principles underpinning stereo vision.

The general context of FIGS. 1 and 2, as set out above, is used as a reference throughout the following description.

Figure 3B:
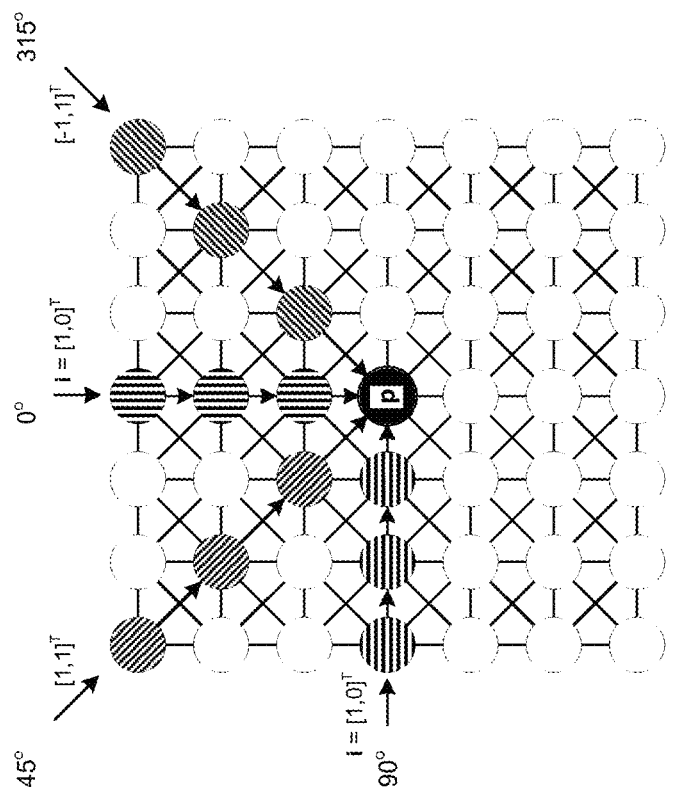
FIG. 3a-d shows an array of pixels annotated to illustrate the principles of SGM (FIG. 3a), one possible FPGA implementation of SGM (FIG. 3b), MGM, (FIG. 3c) and what is referred to herein as R³SGM (FIG. 3d)
Figure 3A:
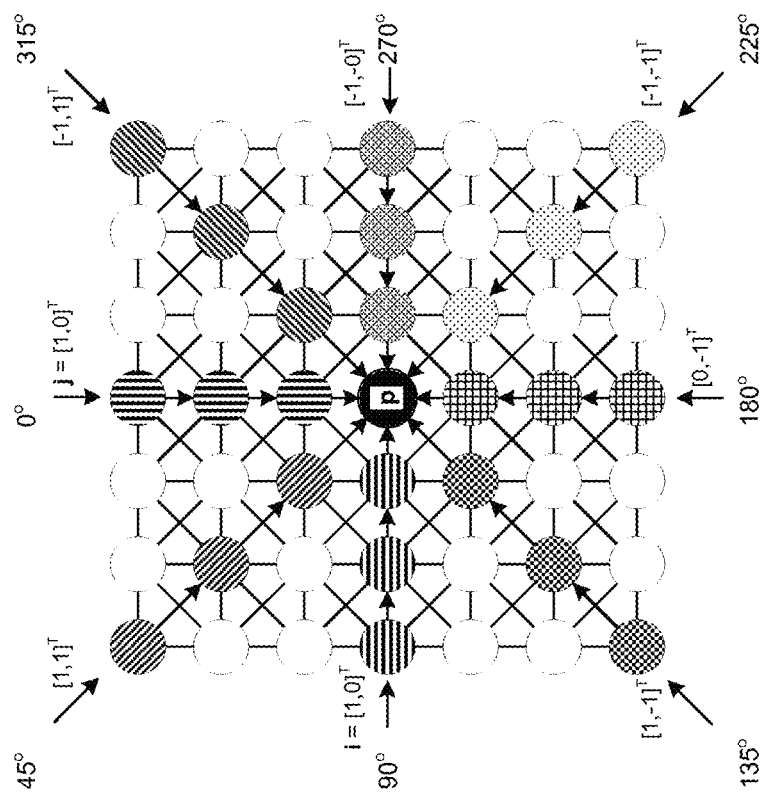

By way of comparison, FIGS. 3A and 3B shows the pixels used to compute a cost vector $L_r(p, \cdot)$ for pixel p (in black) and each scan line r for a set of scan lines R, for a full implementation of SGM (FIG. 3A—see Section 2.1, below) and a typical raster-based FPGA implementation of SGM (FIG. 3B—see Section 2.1.1, below). Each distinct shading denotes a distinct scan line direction as set out in Table 1 below.

Figure 3C:
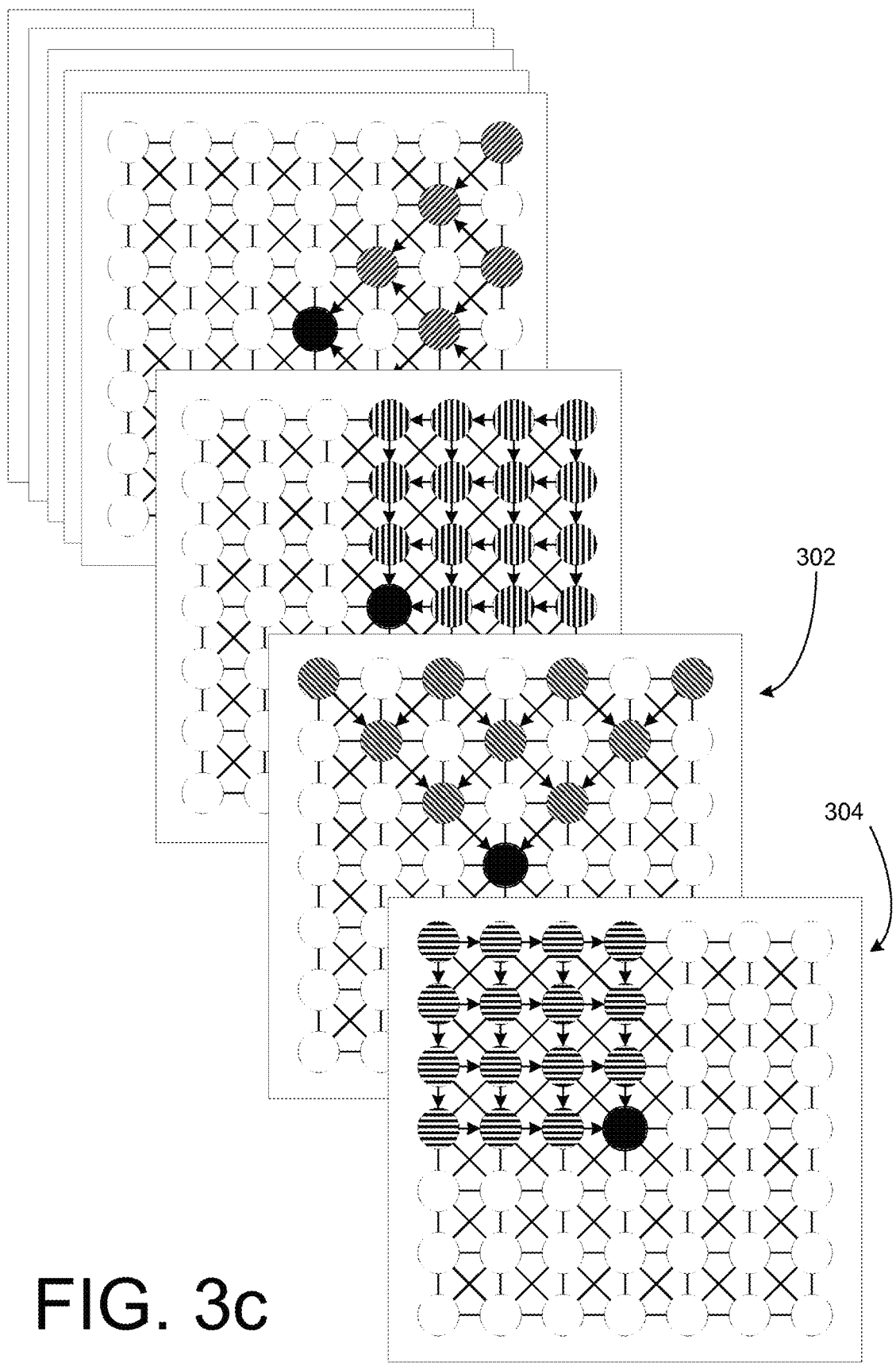

FIG. 3C show the pixels that MGM would use for the same scan lines (see Section 2.2 below).

Figure 3D:
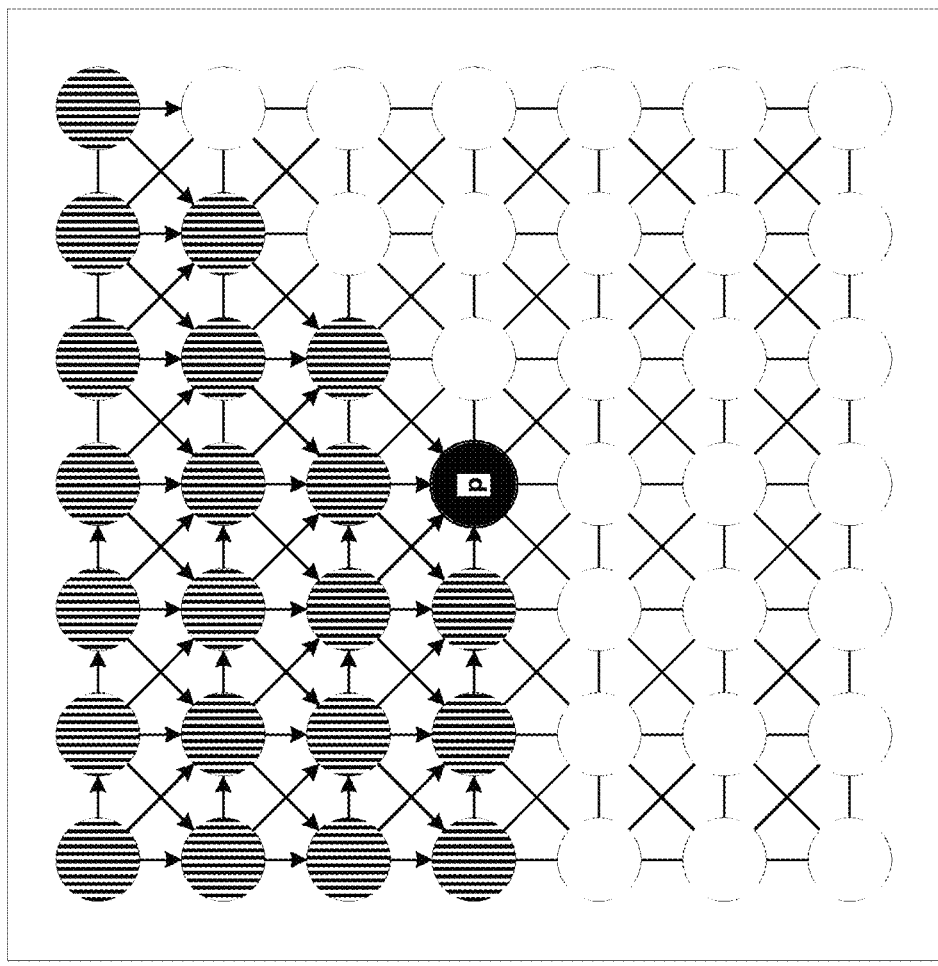

Finally, FIG. 3D shows the pixels used to compute a single cost term in accordance with the described embodiments of the invention—adopting what is referred to herein as an R³SGM approach. The R³SGM approach is able to estimate disparities whilst processing pixels in a streaming fashion. Note that to compute the single cost vector associated with the black pixel, only the cost vectors from pixels that precede it in raster order are required. See Section 3 below for more details.

R³SGM provides a novel variant of the semi-global matching algorithm which is real-time, raster-respecting and suitable for power-constrained systems. It is highly conducive to implementation on an FPGA or circuit-based platform or other embedded device.

2.1 Semi-Global Matching (SGM)

SGM is a popular stereo matching method, owing to the good balance it achieves between accuracy and computational cost. It aims to find a disparity map D that minimises the following energy function, defined on an undirected graph G=(I, ε), with I the image domain and ε a set of edges defined by the 8-connectivity rule:

$$E(D) = \sum_{p \in I} C_p(D(p)) + \sum_{\{p,q\} \in \mathcal{E}} V(D(p), D(q)) \quad (1)$$

Pixel connectivity defines how pixels relate to their neighbours. An 8-connected pixel is a neighbour to every pixel that "touches" its edges and corners, i.e. which is immediately adjacent to it horizontally, vertically or diagonally. Hence, the set ε contains every pair of pixels that are horizontal, vertical or diagonal neighbours.

Each unary term $C_p(D(p))$ represents a 'matching cost' of assigning pixel p in the left image L the disparity $D(p) \in D$, where $D = [0, d_{max}]$ is the range of possible disparities that may be assigned to any pixel. An assigned disparity of D(p) would match pixel p in the left image L with the following pixel in the right image R:

$$p - D(p)i$$

where $i=[1,0]^T$ i.e. the unit horizontal vector lying parallel to the pixel rows in the direction of increasing pixel index. The choice of matching function is typically based on (i) the desired invariances to nuisances (e.g. changes in illumination) and (ii) computational requirements.

The notation $C_p(\cdot)$ is used to denote a unary cost vector having $d_{max}+1$ components, the dth component of which is $C_p(d)$, i.e. the matching cost of assigning pixel p the disparity d.

Each pairwise term V(D(p), D(q)) encourages smoothness by penalising disparity variations between neighbouring pixels:

$$V(d, d') = \begin{cases} 0 & \text{if } d = d' \\ P_1 & \text{if } |d - d'| = 1 \\ P_2 & \text{otherwise} \end{cases} \quad (2)$$

The penalty $P_1$ is typically smaller than $P_2$, to avoid over-penalising gradual disparity changes, e.g. on slanted or curved surfaces. By contrast, $P_2$ tends to be larger, so as to more strongly discourage significant jumps in disparity.

Since the minimisation problem posed by Equation 1 is NP-hard, and thus computationally intractable in many practical contexts, SGM approximates its solution by splitting it into several independent 1-dimensional (1D) problems defined along scan lines. More specifically, it associates each pixel p in the image with 8 scan lines, each of which follows one of eight cardinal directions (0°, 45°, . . . , 315°), as per FIG. 3a.

FIG. 3a shows a schematic block diagram of a portion of an image, in which individual pixels are represented by circles. The pixels are arranged in a two-dimensional grid, and pixels lying along the eight scan lines associated with pixel p (denoted by the black circle in the grid) are denoted by pixels shaded according to the scheme set out Table 1 below.

These eight scan lines can be denoted as a vector set $R \subseteq R^2$:

$$R = \left\{ \begin{bmatrix}1\\0\end{bmatrix}, \begin{bmatrix}1\\1\end{bmatrix}, \begin{bmatrix}0\\1\end{bmatrix}, \begin{bmatrix}-1\\1\end{bmatrix}, \begin{bmatrix}-1\\0\end{bmatrix}, \begin{bmatrix}-1\\-1\end{bmatrix}, \begin{bmatrix}0\\-1\end{bmatrix}, \begin{bmatrix}1\\-1\end{bmatrix} \right\}. \quad (3)$$

Table 1 shows indicates which vector in R corresponds to each scan direction, using the notation $i=[0,1]^T$ and $j=[1,0]^T$ to denote the vertically downward and left direction vectors respectively.

TABLE 1

The eight possible scan-line directions and the scheme used to represent them in Figured 3A-D and 4.

| Angle | Scan Direction | Direction Vector $r \in R$ | Shading |
|---|---|---|---|
| 0° | Vertically Down/South (S) | $\downarrow = j = [0, 1]^T$ | Vertical hatch |
| 45° | Right-Down Diagonal/ South-East (SE) | $\searrow = [1, 1]^T$ | SE diagonal hatch |
| 90° | Right/East (E) | $\rightarrow = i = [1, 0]^T$ | Horizontal hatch |
| 135° | Right-Up Diagonal/ North-East (NE) | $\nearrow = [1, -1]^T$ | Chequered |
| 180° | Up/North (N) | $\uparrow = [0, -1]^T$ | NS crosshatch |
| 225° | Left-Up/North-West (NW) | $\nwarrow = [-1, -1]^T$ | Dotted |
| 270° | Left/West (W) | $\leftarrow = [-1, 0]^T$ | Diagonal crosshatch |
| 315° | Left-Down/ South-West (SW) | $\swarrow = [-1, 1]^T$ | SW diagonal hatch |

Each pixel p is then associated with a directional cost $L_r(p,d)$ for each direction $r \in R$ and each disparity d. These costs can be computed recursively via $$L_r(p, d) = C_p(d) + \min_{d' \in \mathcal{D}} (L_r(p - r, d') + V(d, d')) - \min_{d' \in \mathcal{D}} L_r(p - r, d'), \quad (4)$$

in which p–r refers to the pixel preceding p along the scan line denoted by r. The minimum $L_r$ cost associated with p–r is subtracted from all costs computed for p to prevent them growing without bound as the distance from the image edge increases.

The notation $L_r(p, \bullet)$ is used to denote an "intermediate" (directional) cost vector for pixel p and scan line r, which in the present example has $d_{max}+1$ components, the dth component of which is $L_r(p, d)$.

Having computed the directional costs, SGM then sums them to form an aggregated cost volume:

$$L(p, d) = \sum_{r \in R} L_r(p, d) \quad (5)$$

The notation $L(p, \bullet)$ denotes a "final" disparity cost vector for pixel p, which in the present example has $d_{max}+1$ components, the dth component of which is $L(p, d)$.

Finally, it selects each pixel's disparity using a Winner-Takes-All (WTA) approach to estimate a disparity map D*:

$$D^*(p) = \underset{d \in \mathcal{D}}{\operatorname{argmin}} L(p, d) \quad (6)$$

In other words, the disparity D*(p) assigned to pixel p is the smallest component of the final cost vector $L(p, \bullet)$ for that pixel.

The disparities estimated by SGM only approximate the solution of the initial problem of Equation 1 (which would need a smoothness term to be enforced over the whole image grid) but they are much less demanding to compute and, despite causing streaking artifacts in the final disparity image, have been proven to be accurate enough for some practical purposes.

One technique that may be used to filter out incorrect disparity values is an LR consistency check, which involves computing the disparities not just of pixels in the left image, but also in the right image, and checking that the two match (e.g. checking that if p in the left image has disparity d, then so does pixel p–di in the right image). In other words, stereo depth estimation is performed twice for each image pair—once with the left image as the target and the right image as the reference, and once with the right image as the target and the left image as the reference—and the results are compared to remove depth pixels which do not meet a defined consistency condition.

Observe that the disparities of pixels in the right image have the opposite sign, i.e. that assigning pixel p' in the right image a disparity of d matches it with pixel p'+di in the left image.

Regardless of whether LR consistency checking is used or not, though, SGM has drawbacks:
(i) as mentioned earlier, it suffers from streaking in textureless/repetitive regions (which LR checks can mitigate but do not solve),
(ii) there is a need to store the entire unary cost image (or images, when checking), to allow the computation of the directional contributions to the final cost, and
(iii) there is a need for multiple passes over the data, to recursively compute the directional components used in Equation 5.

To deploy SGM on a limited-memory platform, e.g. an FPGA, some compromises must be made, as will now be discussed.

2.1.1 SGM on FPGAs

Due to the recursive term in Equation 4, the directional cost for a given scan line r and a given pixel p cannot be computed until the directional cost(s) for all pixels preceding p on the scan line r to the edge of the image to have been computed. In other words, the direction cost for the first pixel on the scan line r at the edge of the image must be computed first, and then the directional costs for successive pixels along the scan line r need to be computed in turn.

As the computation of the directional costs for a pixel requires the cost function for all pixels along the scan line (from the edge of the image) to have been computed already, an FPGA implementation of SGM will typically focus only on the scan lines that would be completely available when evaluating a pixel. If pixels in the images are available in raster order, then these will be the three scan lines leading into the pixel from above, and the one leading into it from its left (see FIG. 3b). In the present example, pixels are provided in a time sequence (stream) from left to right, starting with the first column (so starting at the top-left corner of the image) and then in the same manner for the next column vertically below that column until the bottom-right corner of the image is reached).

Observe from Equation 4 that to compute the directional costs for a pixel p along a scan line r, only its ulnaris $C_p$ and the directional cost vector $L_r(p-r, \cdot)$ associated with its predecessor p−r are required. Hence, restricting SGM to the four directions indicated in FIG. 3b means that only the directional cost vectors for pixels which have already been received (before pixel p) are required in order to assign a disparity to pixel p.

Memory requirements are also a constraint for implementations on accelerated platforms: when processing pixels in raster order, temporary storage is required for the directional costs $L_r$ associated with every predecessor of the pixel p being evaluated, so the more scan lines that are considered, the more storage is required from the FPGA fabric. Due to the limited resources available on FPGAs, the choice to limit the number of scan lines thus not only allows the processing of pixels in raster order, but also to keeps the complexity of the design low enough to be deployed on such circuits.

2.2 More Global Matching (MGM)

The streaking effect that afflicts SGM is caused by the star-shaped pattern used when computing the directional costs (see FIG. 3a): this makes the disparity computed for each pixel depend only on a star-shaped region of the image. To encourage neighbouring pixels to have similar disparities, SGM relies on their 'regions of influence' overlapping; however, if the areas in which they overlap are un-informative (e.g. due to limited/repetitive texture), this effect is lost. As a result, if the contributions from some scan lines are weak, whilst those from others are strong, the disparities of pixels along the stronger lines will tend to be similar, whilst there may be little correlation along the weaker scan lines: this can lead to streaking. This is an inherent limitation of SGM, and one that is only accentuated by removing scan lines, as is FIG. 3b.

As indicated above, a recent extension of SGM reduces streaking by incorporating information from multiple directions into the costs associated with each scan line. To do this, Equation 4 is modified to additionally use the cost vectors of pixels on the previous scan line: see FIG. 3c. More specifically, when computing the cost vector $L_r(p, \cdot)$ for pixel p and direction r, the cost vector computed for the pixel $p-r^\perp$ "above" it where "above" is defined relative to r, and has the usual meaning when r is horizontal.

Figure 4:
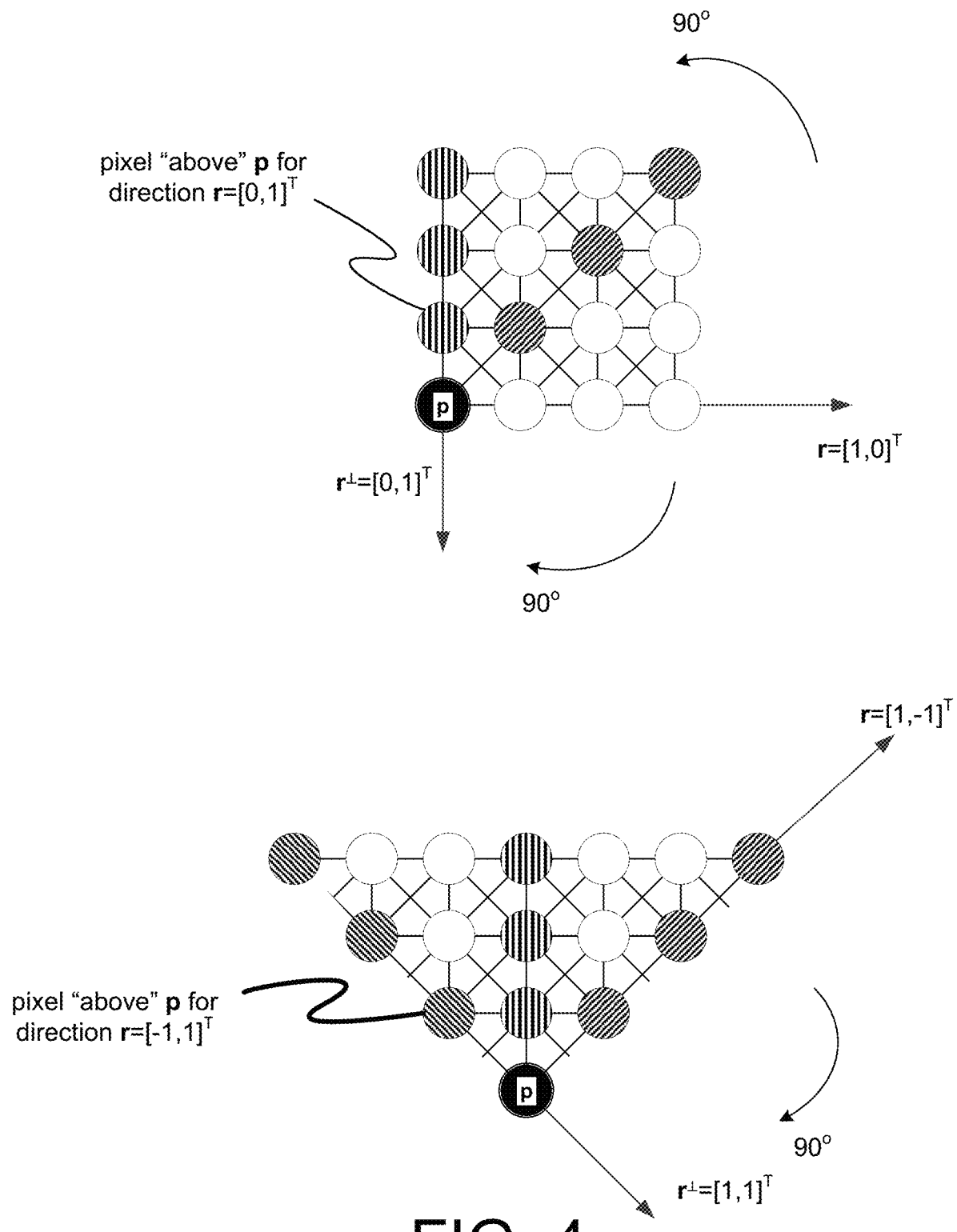
FIG. 4 shows how a perpendicular direction to a scan line is defined.

As shown by example in FIG. 4, $r^\perp$ is defined here as the vector in R which lies 90° clockwise from r and the pixel above p for direction r is neighbour to p (i.e. the closest pixel to p) in the direction $-r^\perp$.

Equation 4 then becomes:

$$L_r(p, d) = C_p(d) + \frac{1}{2} \sum_{x \in \{r, r^\perp\}} \min_{d' \in \mathcal{D}} (L_r(p - x, d') + V(d, d')) \quad (7)$$

This approach has been shown to be more accurate than SGM, whilst running at a similar speed. However, unfortunately, the directional costs are hard to compute on accelerated platforms, and so MGM cannot easily be sped up to obtain a real-time, power-efficient algorithm.

That is, whilst MGM is very effective at removing streaking, since all but two of its directional minimisations (specifically, as denoted by reference numerals 302 and 304 in FIG. 3c, for which $r=[1, 0]^T$ and $r=[1, 1]^T$ respectively) rely on pixels that would not be available when streaming the image in raster order, a full implementation of the algorithm on an FPGA is difficult to achieve (see Section 2.1.1).

One solution to this might be to implement a cut-down version of MGM that only uses those of its directional minimisations that do work on an FPGA (i.e. 302 and 302 in FIG. 3c), thereby mirroring one way in which SGM has been adapted for FPGA deployment. However, if the algorithm were to be limited to one of MGM's directional minimisations (e.g. 304), then the 'region of influence' of each pixel shrinks, resulting in poorer disparities, and if both are used, then double the amount of memory is required to store the cost vectors (see Section 2.1.1).

3. R³SGM

To avoid these problems, a compromise approach is adopted—referred to herein as "R³SGM"—which is inspired by the way in which MGM allows each directional cost for a pixel to be influenced by neighbouring pixels in more than one direction to mitigate streaking.

R³SGM approach uses only a single directional minimisation, but one that incorporates information from all of the directions that are available when processing in raster order. This approach is inherently raster-friendly, and requires a minimal amount of memory on the FPGA. When processing the image in raster order, the cost vector for each pixel is computed by accumulating contributions from the four of its eight neighbours that have already been "visited" and had their costs computed (the left, top-left, top and top-right neighbours, as per FIG. 3d). Formally, defining a set of four raster-friendly directions as $$X = \{\rightarrow, \searrow, \downarrow, \swarrow\} = \left\{ \begin{bmatrix} 1 \\ 0 \end{bmatrix}, \begin{bmatrix} 1 \\ 1 \end{bmatrix}, \begin{bmatrix} 0 \\ 1 \end{bmatrix}, \begin{bmatrix} -1 \\ 1 \end{bmatrix} \right\}, \quad (8)$$

then the cost vector $L(p, \cdot)$ associated with each pixel can be computed via:

$$L(p, d) = \quad (9)$$
$$C_p(d) + \frac{1}{|X|} \sum_{x \in X} \left( \min_{d' \in \mathcal{D}} (L(p - x, d') + V(d, d')) - \min_{d' \in \mathcal{D}} (L(p - x, d')) \right)$$

Since, unlike SGM and MGM, only using a single minimisation is used, this is equivalent to Equation 5 in those approaches—effectively "bypassing" the intermediate computations of Equation 4 (i.e. removing the need for directional cost vectors altogether)—allowing the cost vector for each pixel to be obtained directly in a single pass over the image.

The second term in Equation 9 is an aggregate cost term which combines the cost vectors L(p-x, •) over multiple directions x∈X, when in turn is combined with the unary cost vector of the first term. The unary cost values $C_p(d)$ are an example of matching costs (similarity scores) for the different disparities d∈D, as that terminology is used herein.

The Census Transform (CT) is used to compute the unaries $C_p$. CT is robust to illumination changes between the images, and can be computed efficiently and in a raster-friendly way (see Section 3.1.1 below). Moreover, the Hamming distance between two CT feature vectors can be computed efficiently, and provides a good measure of their similarity.

Further details of the Census Transform may be found in R. Zabih and J. Woodfill. Non-parametric Local Transforms for Computing Visual Correspondence, in ECCV, pages 151-158, 1994, which is incorporated herein by reference in its entirety.

The pixel costs L(p, d) are computed simultaneously for both the left and right images using the FPGA implementation described below in Section 3.1.2). After selecting the best disparity in each image with a WTA approach, the disparities are processed with a median filter (in a raster-friendly way) to reduce noise in the output. Finally, the disparities are validated with an LR check to discard inconsistent results, using a threshold of 1 disparity or 3%, whichever is greater.

3.1. FPGA Implementation

This section demonstrated how the above approach can be implemented on an FPGA. By contrast to the previous sections, which only refer to the computation of the disparities for pixels in the left image, the described implementation computes the disparities for the pixels in both images efficiently to support LR consistency checking (see Section 2.1). Notationally, a distinction is made between the unary costs and cost vectors for the two images using the superscripts (L) and (R).

Two main steps are involved: (i) the computation of the unary costs $C_p^{(L)}(\cdot)$ and $C_p^{(R)}(\cdot)$, and (ii) the recursive computation of the cost vectors $L^{(L)}(p, \cdot)$ and $L^{(R)}(p, \cdot)$.

At the hardware level, an FPGA is formed of a set of programmable logic blocks that can be wired together (via connection pathways) in different ways and independently programmed to perform different functions. This architecture naturally lends itself to an efficient pipeline-processing style, in which data is fed into the FPGA in a stream and different logic blocks try to operate on different pieces of data concurrently in each clock cycle. In practice, the steps considered herein here all involve processing images, with the data associated with the images' pixels being streamed into the FPGA in raster order, as will now be described.

The logic blocks and connection pathways are configured by circuit description code, such as register-transfer level (RTL) code, which is provided to the FPGA.

3.1.1 Unary Computation

Each unary $C_p^{(L)}(d)$, which denotes the cost of assigning pixel p in the left image a disparity of d, is computed as the Hamming distance H between a feature vector $\phi^{(L)}(p)$ associated with pixel p in the left image and a feature vector $\phi^{(R)}(p-di)$ associated with pixel p-di in the right image.

The feature vector $\phi^{(L)}(p)$ is computed by applying the Census Transform to a W×W window around p in the left image, and analogously for $\phi^{(R)}$.

Conversely, $C_p^{(R)}(d)$ becomes the Hamming distance between $\phi^{(R)}(p)$ and $\phi^{(L)}(p+di)$.

Figure 5:
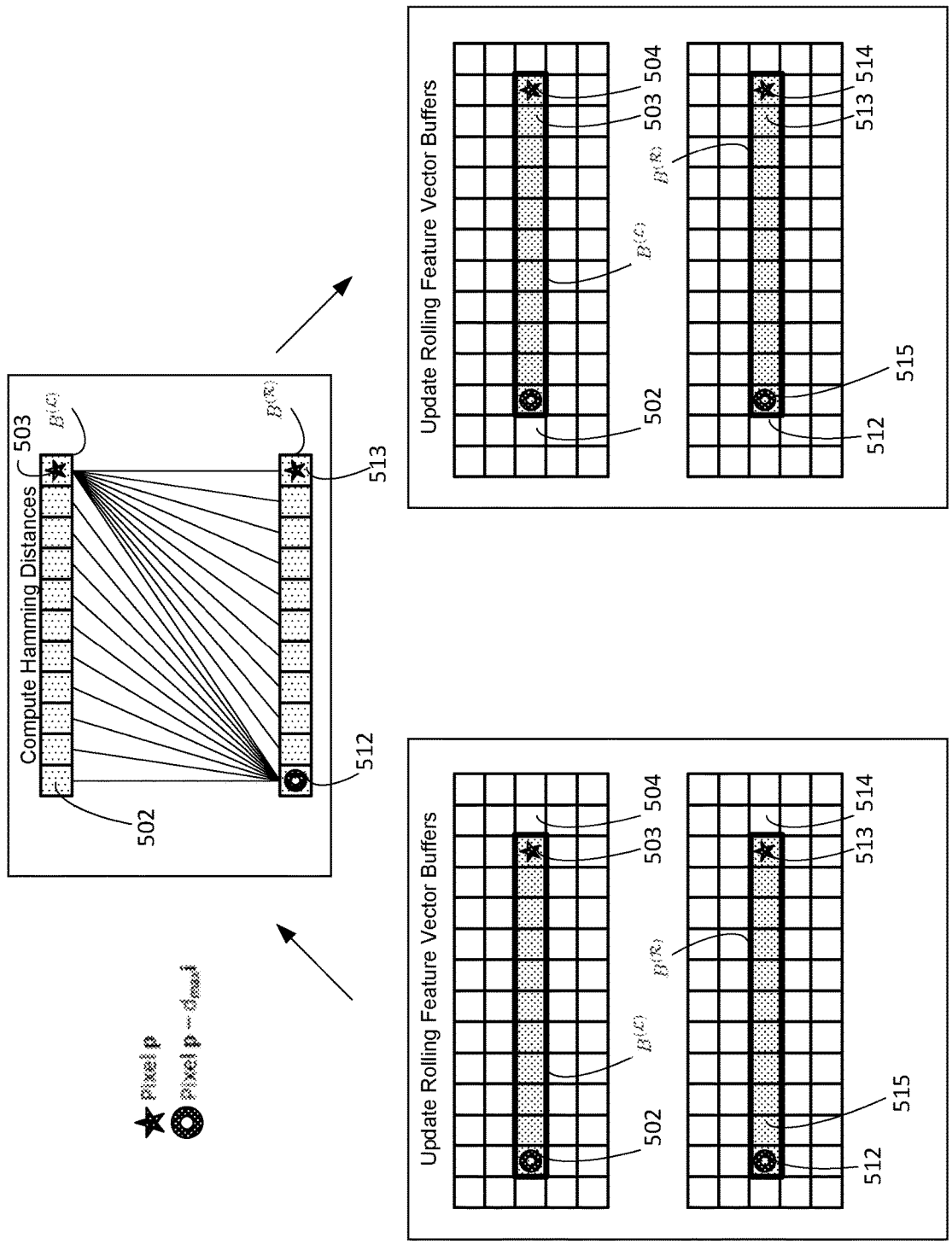
FIG. 5 shows how feature vectors may be stored for the purpose of evaluating unary costs.

As shown in FIG. 5, the left and right images are traversed simultaneously in raster order, computing $\phi^{(L)}(p)$ and $\phi^{(R)}(p)$ for each pixel p at the same stage in the traversal of the pixels. Rolling buffers of feature vectors for the most recent $d_{max}+1$ pixels in each image are retained, i.e.

$$B^{(L)}=[\phi^{(L)}(p-di):d\in D],$$

and analogously for the right image. After computing the feature vectors for pixel p, unaries are computed for all d∈D as follows:

$$C_p^{(L)}(d)=H(\phi^{(L)}(p),\phi^{(R)}(p-di)) \quad C_{p-d_{max}i}^{(R)}(d)=H(\phi^{(L)}(p+(d-d_{max})i),\phi^{(R)}(p-d_{max}i)) \tag{10}$$

Note that the unaries for right image pixels are computed just before they leave the right buffer $B^{(R)}$ since it is only at that point that the feature vectors for all of the relevant left image pixels have been accumulated in the buffer $B^{(L)}$ (see FIG. 5).

FIG. 5 illustrates how, in order to compute the unaries, at each pixel p, $\phi^{(R)}(p)$ and $\phi^{(L)}$ are computed and then used to update the rolling buffers $B^{(L)}$ and $B^{(R)}$ (feature buffers). The unaries $$C_p^{(L)}(d) \text{ and } C_{p-d_{max}i}^{(R)}(d) \text{ for all } d\in D$$

are computed as the Hamming distances between the relevant feature vectors (see Equation 10) before moving on to the next pixel.

In the lower part of FIG. 5, at the left and right hand sides respectively, the contents of the left and right feature vector buffers $B^{(L)}$ and $B^{(R)}$ are shown at sequential stages of the traversal. Each buffer holds the feature vector of a "current" pixel p in that image. Pixel p in the left image is the pixel for which the unaries are being computed in the current stag. IN addition, the buffers hold the $d_{max}$ pixels to the left of p in the same row. As shown in the top half of the figure, a set of $d_{max}+1$ Hamming distances are computed as per equation 10 for pixel p in the left image L and pixel $p-d_{max}i$ in the right image R. That is to say, the processing of the right image is delayed relative to that of the left image by $d_{max}$ pixels, i.e. the unaries are computed for pixel p in the left image at the same stage of the processing as the unaries are computed for pixel $p-d_{max}i$ in the right image.

As can be seen, at the next stage, the context of the buffers has shifted by one pixel: in the earlier stage, pixel p of the left (resp. right) image is the pixel denoted by reference numeral 503 (rep. 513), and pixel $p-d_{max}i$ is the pixel denoted by reference numeral 502 (resp. 512); whereas, in the next stage, the pixel to the immediate right of pixel 503 (resp. 513), as denoted by reference numeral 504 (resp. 514) has entered the left (resp. right) buffer and pixel 502 (resp. 512) has left it. Pixel 504 in the left image is now the current pixel p for which unaries are computed in the next stage, and the pixel denoted by reference numeral 515 in the right image (immediately to the right of pixel 512) is now pixel $p-d_{max}i$ for which unaries are simultaneously computed.

In practice, to efficiently compute the feature vectors, a W×W window of the pixels surrounding p that can be used to compute the Census Transform are maintained.

Figure 6:
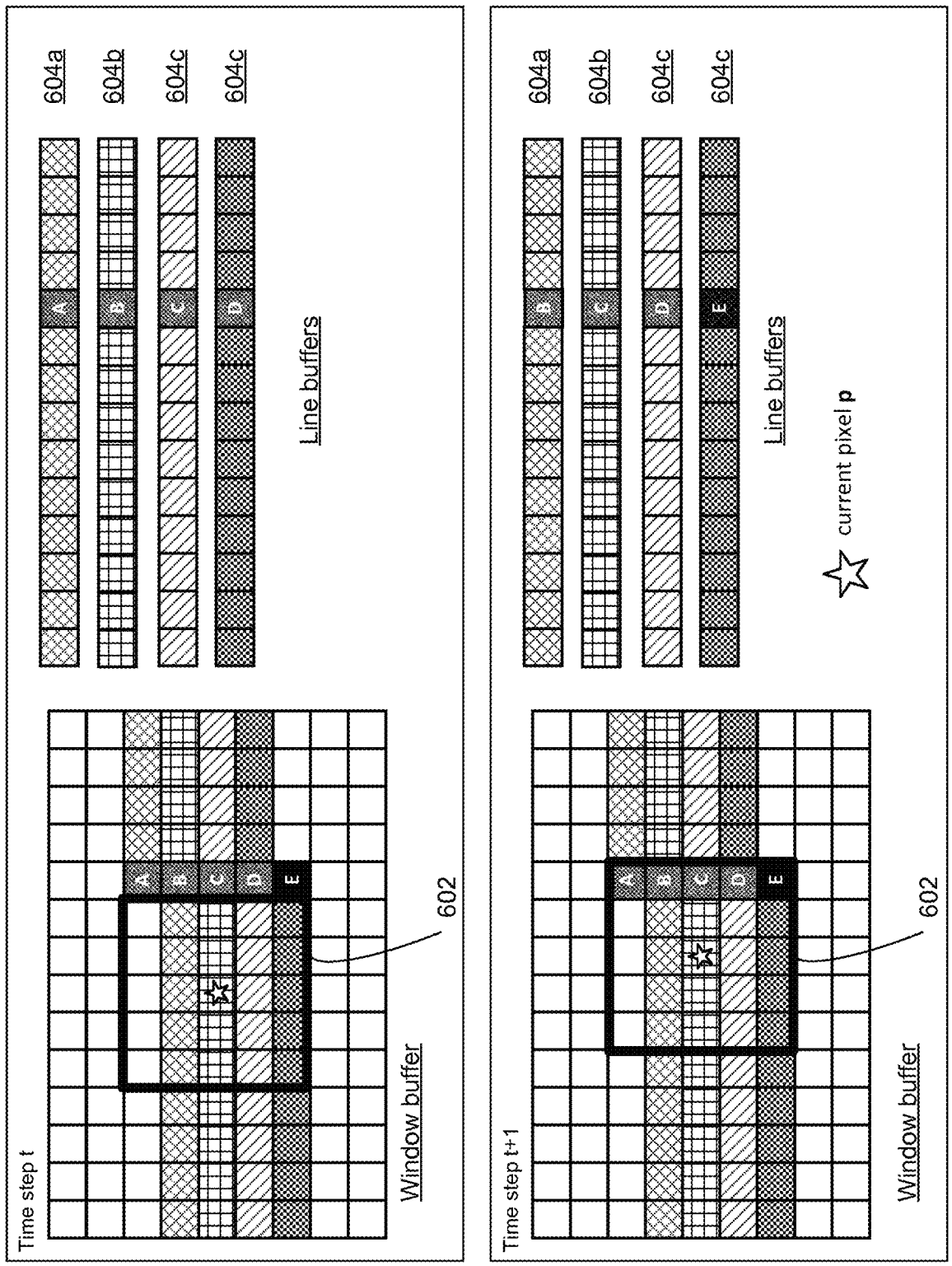
FIG. 6 shows how pixel values may be stored for the purpose of determining feature vectors.

FIG. 6 shows a set of buffers used to facilitate the computation of the Census Transform feature vectors (pixel buffers), and how they are updated from one pixel to the next.

As shown in FIG. 6, the window of pixels is stored in a window buffer 602 (local registers on an FPGA that can be used to store data to which instantaneous access is needed). To keep the window buffer full, the algorithm reads ahead of p by slightly over ⌊W/2⌋ rows, where ⌊•⌋ denoted the floor function. Separately, pixels from the rows above/below p are maintained in line buffers 604a-d (regions of memory on an FPGA that can store larger amounts of data but can only provide a single value per clock cycle).

In this case, the height of the window buffer is W=5, and four line buffers are provided (1 to 4) denoted by reference numerals 604a-d respectively.

As shown in FIG. 6, some pixels may be held simultaneously in both the window buffer 602 and one of the line buffers 604a-d (each of which is the size of the width of the image). When moving from one pixel to the next, the window buffer 602 and line buffers 604a-d are updated as shown in FIG. 6. Notice the way in which the individually marked pixels A-D in the line buffers 604a-d respectively are shifted "upwards", into the preceding line buffer to make way for the new pixel (E) that is being read in (to both the fourth line buffer 604d and the window buffer 602), and how pixel A is removed from the first line buffer 602a but added to the top-right of the window buffer 604. All of these operations can be implemented very efficiently on an FPGA.

3.1.2 Cost Vector Computation

Once the unaries have been computed, the next step is to compute the L(p, d) values (i.e. the cost vector) for each pixel using Equation 9. This again involves a walk over the image domain in raster order. In this case, computing the cost vector for each pixel p uses the cost vectors of the pixels p−x, for each x∈X (i.e. the three pixels immediately above p and the pixel to its immediate left). Therefore these must be in memory when the cost vector for p is computed.

Figure 7:
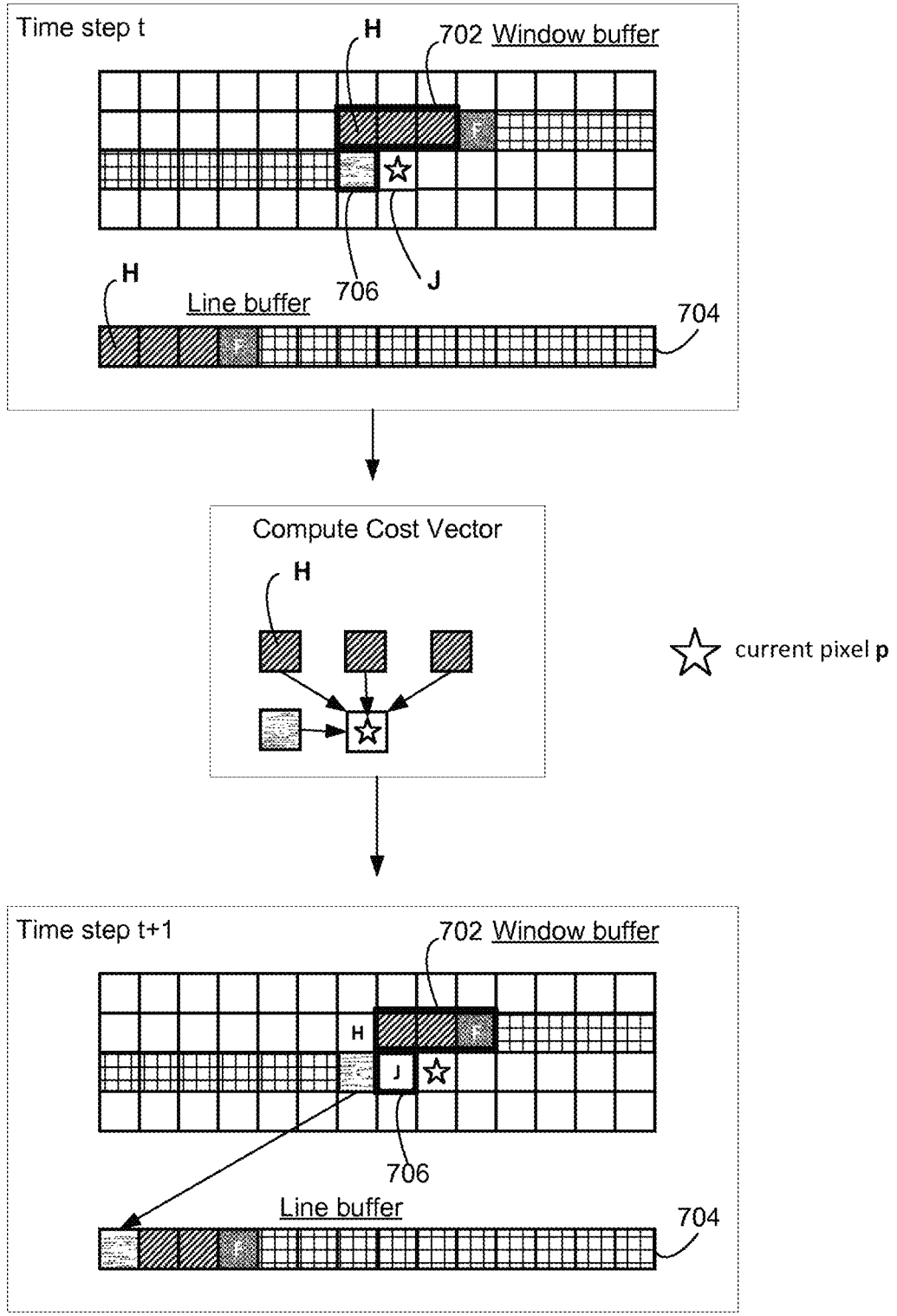
FIG. 7 illustrates the dependency of a final disparity cost vector for a current pixel on the final disparity cost vectors assigned to its neighbouring pixels, and how the latter may be stored accordingly.

FIG. 7 shows a set of buffers used to facilitate the computation of the cost vectors (cost buffers), and how they are updated from one pixel to the next. In the example of FIG. 7, the cost vector for the pixel labelled J is computed at time step t, i.e. J is the current pixel p at time step t. The pixel immediately to the right of J becomes the current pixel at time step t+1.

In practice, as shown in FIG. 7, the relevant cost vectors are divided between several different locations in memory: (i) a line buffer 704 whose size is equal to the width of the image, (ii) a window buffer 702 that holds the cost vectors for the three neighbouring pixels above the current pixel p, and (iii) a register 706 that holds the cost vector for the pixel to the left of p—so the cost for the pixel labelled G at time step t and the cost for pixel J itself at time step t+1, as computed in the preceding time step t. This provides instantaneous access to the cost vectors that are needed to compute the cost vector for p, whilst keeping track of the cost vectors for the pixels that will be needed to compute the cost vectors for upcoming pixels (via the line buffer 704). When moving from one pixel to the next, the window buffer 702 and line buffer 704 are updated as shown in FIG. 7, with the result that the cost for pixel H is removed from both the line buffer 704 and the window buffer 702. Pixel F replaces pixel H in the window buffer and pixel G replaces pixel H in the line buffer 704. The register 706 is updated to replace the cost computed in the previous time step with the cost computed in the current time step, ready for the next time step.

The window buffers 602, 702 can be implemented as one or more lookup tables (LUTs) or a set of registers or flip-flops etc.

The line buffers 604, 704 can for example be implemented as dual-port memory blocks (e.g. random access memory) to allow singe-value read and write access simultaneously.

Equation 9 is re-written to reflect the actual computation of L(p, d) as:

$$L(p, d) = C_p(d) + \frac{1}{|X|} \qquad (11)$$

$$\sum_{x \in X} \Big( \min\{L(p-x, d), L(p-x, d-1) + P_1, L(p-x, d+1) + P_1,$$

$$\min_{d' \in \mathcal{D}}(L(p-x, d') + P_2)\} - \min_{d' \in \mathcal{D}}(L(p-x, d')) \Big)$$

This allows for a more optimal implementation in which $$\min_{d' \in \mathcal{D}}(L(p-x, d'))$$

is computed once and stored to avoid repeat computations.

According to the terminology used herein, the term:

$$L(p,d)$$

as used above is an example of what is referred to herein as a final disparity cost for pixel p and disparity d. These final disparity costs for all of the different disparities d∈D under consideration (candidate disparities) constitute a final disparity cost vector for pixel p, and are referred to as cost components of the final disparity cost vector herein. This cost vector is final in that the disparity that is assigned to pixel p, denoted D*(p), is the disparity corresponding to its lowest cost component, i.e.:

$$D^*(p) = \operatorname*{argmin}_{d \in \mathcal{D}} L(p, d)$$

By contrast, in the context of MGM and SGM, the cost components:

$$L_r(p,d),$$

(with the r subscript) as would be computed for the different cardinal directions r in SGM or MGM, form intermediate cost vectors, because the disparity is not assigned from any of these directly. In that case, the intermediate cost components for each disparity that are obtained from independent directions of aggregation are combined to give a final cost component for disparity d as per Equation 4, which, in turn, is used to assign the disparity to pixel p as per Equation 5.

What is more, in MGM and SGM, it is the intermediate costs $L_r(p,d)$ that have been computed for adjacent pixels in a target image that are used to compute the cost vector for the current pixel. As indicated, the present disclosure recognizes this as a significant source of inefficiency, because it requires multiple disparity cost vectors to be stored for each pixel (one for each cardinal direction—so eight intermediate cost vectors for a full eight direction implementation, each having |D| components), and used in the computation of the cost vectors for the adjacent pixels. Not only does this increase the memory requirements significantly, in CPU/GPU implementation it also limits the speed at which the processing can be performed, as it requires a relatively large number of data accesses in order to compute the cost vector for each pixel. It also acts as a barrier to an efficient FPGA/circuit implementation, for the reasons explained above.

R³SGM solves these problems by instead computing the final disparity cost vector for each pixel of the target image directly from the final disparity cost vectors of one or more of the adjacent pixels in the target image. This allows the image processing to be performed much faster, with reduced memory requirements—as only a single disparity cost vector needs to be stored per pixel (i.e. one vector having |D| components)—whilst still achieving an acceptable level of accuracy.

Recursion loops can be avoided by considering only "previous" pixel directions. That is, by taking into account, in computing the cost vector for any given pixel, only cost vector(s) that have already been computed for previous pixels (if any—see below for edce cases).

Preferably, for an image streamed in raster order, the final disparity cost vector for each pixel is computed using all of the available final disparity cost vectors for the adjacent pixels, which in the case of an image that is rastered from top left, is the pixel to the left of the current pixel in the same scan line, and the three pixels adjacent to it in the scan line above it. This incorporates the maximum amount of information about neighbouring pixels, thus giving the most accurate results that can be obtained, without comprising the speed and efficiency of the algorithm.

The invention can be implemented in software, wherein the functions are carried out by one or more processors (e.g. CPU(s) and/or GPU(s)) according to executable instructions, and in that context the reduced memory requirements also translate to fewer memory accesses and hence a faster algorithm. However, as noted, the invention is particularly well-suited to an efficient FPGA/circuit implementation, and in that context the reduced memory requirements translate to fewer memory blocks (for buffering/saving past results) and fewer logic blocks due to the lower complexity. The overall effect is that the invention can be implemented with a particularly "lean" (efficient), and therefore fast-operating, circuit/design.

In the embodiments described above, the disparity cost vector for the top-left pixel (the very first pixel for an image rastered from top-left) will be computed from only the matching disparity costs $C_p(d)$ for that pixel. There will also be a number of pixels running along the top and down the left-hand side of the image where the number of adjacent pixels for which disparity cost vectors have already been computed is less than four. Hence only a subset of the pixels will have disparity cost vectors that take into account the disparity cost vectors of four adjacent pixels.

It is also noted that the term "lowest cost component" corresponds to the disparity that is overall penalized the least (i.e. the most promising disparity based on the criteria being applied), irrespective of how that cost may be represented (for example, in the above, the lowest cost corresponds to the minimum-valued component, but alternatively a lower cost (penalty) could be represented using a higher numerical value, in which case the lost cost component would be the maximum-valued component).

4. Experiments

Experiments have been performed on the KITTI [29, 30] and Middlebury [39, 40] datasets to evaluate the $R^3SGM$ approach. The frame rate across different resolutions and disparity ranges is reported in comparison to competing FPGA-based approaches, and the FPGA resource costs of the $R^3SGM$ approach is broken down for several variations of the design set out herein.

On KITTI, $R^3SGM$ is compared to the only two approaches from the benchmark that are able to achieve state-of-the-art performance in real time [24, 15], both of which require a powerful GPU (an Nvidia GTX Titan X) to run. Since, unlike these approaches, the $R^3SGM$ approach does not naturally produce disparities for every single pixel in the image, the results are interpolated as specified by the KITTI evaluation protocol in order to make the results comparable with theirs. As shown in Table 2, $R^3SGM$ is able achieve post-interpolation results that are competitive on accuracy with these approaches, whilst significantly reducing the power consumption and the compute power required. Further-more, compared to the additional power efficient implementation reported in (on a Nvidia Tegra), which achieves 13.8 fps with 10 Watts when scaled to the KITTI dataset, the present system is >5× faster whilst consuming less than a third of the power. Moreover, $R^3SGM$ is able to achieve an even better error rate (4.8%) pre-interpolation, with a density of 85%. For some applications, this may in practice be more useful than having poorer disparities over the whole image.

TABLE 2

Thequantitative results of the $R^3SGM$ approach ("Ours"), in comparison to state-of-the-art GPU-based real-time methods, on the Stereo 2015 subset of the KITTI dataset [29, 30].

| Method | D1 Valid | Density | D1 Interpolated | Runtime | Environment | Power Consumption (W) (approx.) |
|---|---|---|---|---|---|---|
| Ours | 4.8% | 85.0% | 9.9% | 0.014 s | FPGA (Xilinx ZC706) | 3 |
| DeepCostAggr[24] | — | 99.98% | 6.3% | 0.03 s | Nvidia GTX Titan X | 250 |
| CSCT+SGM+MF[15] | — | 100% | 8.2% | 0.006 s | Nvidia GTX Titan X | 250 |

D1 Valid: error rate ont he pixels surviving the LR check; Density: % of the pixels output by the algorithm (in the $R^3SGM$ case after the LR check); D1 Interpolated: error rate after interpolating acording to the KITTI protocol. A threshold of the greater of 3 disparity values or 5%, is used (i.e. the standard thresholds for KITTI). The $R^3SGM$ approach is able to produce post-interpolatio results that are within striking distance of existing methods, whilst being two orders of magnitude more power-efficient and requiring much less computational power.

Figure 8:
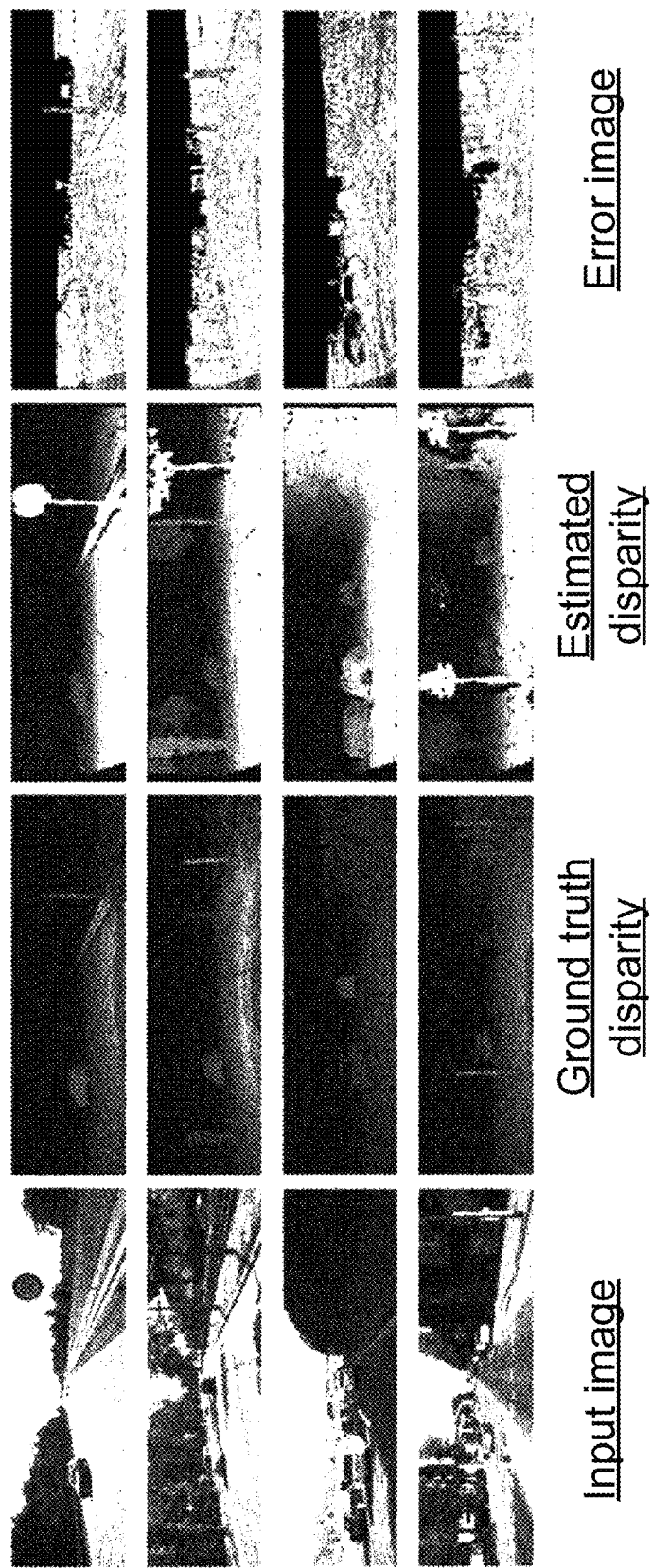
FIG. 8 shows a selection of qualitative examples of the R³SGM approach on frames from the KITTI dataset

FIG. 8 shows a selection of qualitative examples of the $R^3SGM$ approach on frames from the KITTI dataset [29, 30]. The images in FIG. 4 are arranged in columns as follows:

Column 1: input left image;

Column 2: ground truth disparities;

Column 3: the disparities produced by the $R^3SGM$ approach;

Column 4: error image.

On Middlebury, Table 3 and Table 4 show that $R^3SGM$ is able to achieve comparable accuracy to a number of other FPGA-based methods, whilst either running at a much higher frame-rate (c.f. [10, 46]), using simpler, cheaper hardware (c.f. [42]) or handling greater disparity ranges (c.f. [34, 50]).

TABLE 3

The accuracy of some FPGA-based methods on images from the Middlebury Stereo Datasets [39, 40].

| | Cones | | | Teddy | | | Tsukuba | | | Venus | | |
|---|---|---|---|---|---|---|---|---|---|---|---|---|
| Method | non-occ. | all | disc. | non-occ. | all | disc. | non-occ. | all | disc. | non-occ. | all | disc. |
| Ours | 3.4 | 8.9 | 10.3 | 8.2 | 14.6 | 22.4 | 9.7 | 11.2 | 31.2 | 1.0 | 1.6 | 11.9 |
| [2], 4 paths | 9.5 | — | — | 13.3 | — | — | 6.8 | — | — | 4.1 | — | — |
| [2], 8 paths | 8.4 | — | — | 11.4 | — | — | 4.1 | — | — | 2.7 | — | — |
| [10] | — | 9.5 | — | — | 13.3 | — | — | 5.9 | — | — | 3.9 | — |
| [42] | 3.5 | 11.1 | 9.6 | 7.5 | 14.7 | 19.4 | 3.6 | 4.2 | 14.0 | 0.5 | 0.9 | 2.8 |
| [46] | 17.1 | 25.9 | 25.8 | 21.5 | 28.1 | 28.8 | 4.5 | 6.0 | 12.7 | 6.0 | 7.5 | 18.2 |
| [50] | 5.4 | 11.0 | 13.9 | 7.2 | 12.6 | 17.4 | 3.8 | 4.3 | 14.2 | 1.2 | 1.7 | 5.6 |
| [34] | 9.3 | 11.1 | 17.5 | 6.0 | 7.4 | 18.7 | 8.8 | 16.4 | 20.0 | 3.9 | 12.0 | 10.3 |

The % of pixels with a disparity error greater than 1 pixel from the ground truth are reported: non-occ. = non-occluded pixels only, all = all pixels, disc. = pixels near discontinuities only.

TABLE 4

The frame rates $R^3SGM$ can achieve, in comparison to those achieved by other FPGA-based methods, for multiple resolution/disparity range combinations.

| Method | Resolution | Disparities | FPS | Environment |
|---|---|---|---|---|
| Ours | 384 × 288 | 32 | 301 | Xilinx ZC706 |
| | 450 × 375 | 64 | 198 | |
| | 640 × 480 | 128 | 109 | |
| | 1242 × 375 | 128 | 72 | |
| [2], 4 paths | 640 × 480 | 64 | 66-167 | Xilinx Virtex 5 |
| | 640 × 480 | 128 | 37-103 | |
| [10] | 340 × 200 | 64 | 27 | Xilinx Virtex 4 |
| [28] | 640 × 480 | 32 | ≥30 | Xilinx Spartan 6 LX |
| [42] | 352 × 288 | 64 | 1121 | Altera Stratix IV |
| | 640 × 480 | 64 | 357 | |
| | 1024 × 768 | 128 | 129 | |
| | 1920 × 1080 | 256 | 47.6 | |
| [46] | 320 × 240 | 64 | 115 | Xilinx Virtex 5 |
| | 320 × 240 | 128 | 66 | |
| | 640 × 480 | 64 | 30 | |
| | 800 × 600 | 64 | 19 | |
| [41] | 1024 × 508 | 128 | 15 | Xilinx Spartan 6 |
| [20] | 752 × 480 | 32 | ≥60 | Xilinx Artix 7 |
| [50] | 1024 × 768 | 64 | 60 | Altera EP3SL150 |
| [34] | 640 × 480 | 32 | 101 | Xilinx Zynq-7000 |

Figure 9:
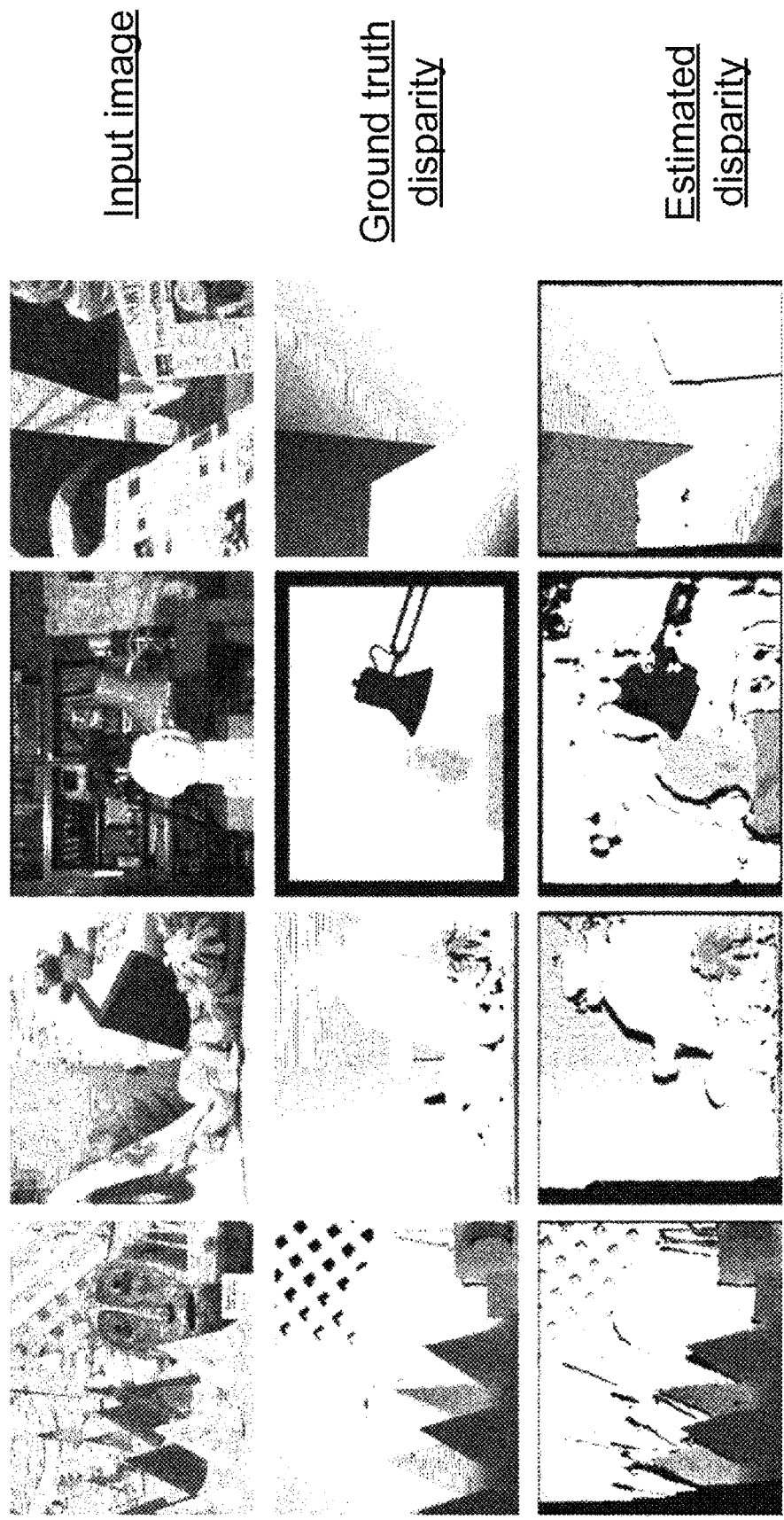
FIG. 9 shows a selection results of the R³SGM approach on the four most commonly used Middlebury images.

FIG. 9 shows a selection results of the $R^3SGM$ approach on the four most commonly used Middlebury images [39, 40]: from left to right, Cones, Teddy, Tsukuba and Venus. Top row: input images; middle row: ground truth disparities; bottom row: the disparities produced by our approach.

Table 5 highlights how the frame rate of the described system is independent of the window size of the Census Transform that is employed. Varying these parameter has, instead, an effect on the quality of the estimated disparities: as the window size increases, the error rate on the KITTI dataset images [29, 30] decreases. As in Table 2, the error rate of the pixels surviving LR check is reported (i.e. the output of the described method) together with their density, and the error rate after an interpolation step done according to the KITTI protocol. As expected, variations in the CT window size also affect the FPGA resource utilisation of the system, i.e. the number of logic/memory units that are required to implement the necessary hardware blocks. This resource utilisation, in turn, impacts the overall amount of power consumed by the FPGA chip. This is also shown, in the last row of Table 5.

TABLE 5

The impact of varing the Census Transform window size ont he frame rate, error and FPGA resource utilisation. As the window size increases, the frame rate remains constant, the error on images from the KITTI dataset [29, 30] descreases, and the FPGA resource utilisation in-creases.

| Window Width | 3 | 5 | 7 | 9 | 11 | 13 |
|---|---|---|---|---|---|---|
| Frame Rate @ 1242 × 375 | 72 | 72 | 72 | 72 | 72 | 72 |
| Error % | 9.3 | 6.7 | 5.8 | 5.4 | 5.0 | 4.8 |
| Density % | 73 | 81 | 83 | 84 | 85 | 85 |
| Interp. Error % | 19.4 | 13.6 | 12.0 | 11.1 | 10.5 | 9.9 |
| LUT Utilisation % | 33.4 | 37.6 | 49.9 | 58.3 | 67.3 | 75.7 |
| FF Utilisation % | 10.8 | 14.2 | 18.1 | 24.7 | 32.2 | 40.5 |
| BRAM Utilisation % | 28.9 | 29.3 | 29.6 | 30.0 | 30.4 | 30.7 |
| Total Power (W) | 1.68 | 1.85 | 2.02 | 2.36 | 3.52 | 1.12 |

5. Conclusion

This disclosure provides $R^3SGM$, a variant of the Semi-Global Matching (SGM) method for stereo disparity estimation that is better-suited to raster processing on an FPGA. Whereas MGM, mitigates the streaking artifacts that afflict SGM by incorporating information from two directions into the costs associated with each scan line—which proves difficult to efficiently accelerate due to the memory access pattern involved in some of its directional minimisations—the $R^3SGM$ method uses only a single, raster-friendly minimisation, but one that incorporates information from four different directions at once.

The $R^3SGM$ approach compares favourably with the two state-of-the-art GPU-based methods [24, 15] that can process the KITTI dataset in real time, achieving similar levels of accuracy whilst reducing the power consumption by two orders of magnitude. Moreover, in comparison to other FPGA-based methods on the Middlebury dataset, $R^3SGM$ achieves comparable accuracy either at a much higher frame-rate (c.f. [10,46]), using simpler, cheaper hardware (c.f. [42]) or handling greater disparity ranges (c.f. [34, 50]). The $R^3SGM$ approach achieves a state-of-the-art balance between accuracy, power efficiency and speed, making it particularly well suited to real-time applications that require low power consumption, such as prosthetic glasses and micro-UAVs.

6. Example Application

An example application of $R^3SGM$ is in autonomous vehicles and other robotic systems.

Autonomous decision making is a critical function of an autonomous vehicle. This is true whatever its level of autonomy, but as the level of autonomy increases, so too does the complexity of the decisions it needs to be able to make safely, to the point where a fully autonomous vehicle needs to be equipped with an exceptionally robust decision making engine that can be relied upon to safely handle any driving scenario it encounters, however unexpected. To be able to do so, it is important that the processing of the sensor signals that feeds into the decision making is not only sufficiently accurate, but also fast and robust enough to be able to make decisions sufficiently quickly and reliably.

In the following, components corresponding to those of FIG. 1 are denoted by the same reference numerals.

Figure 10:
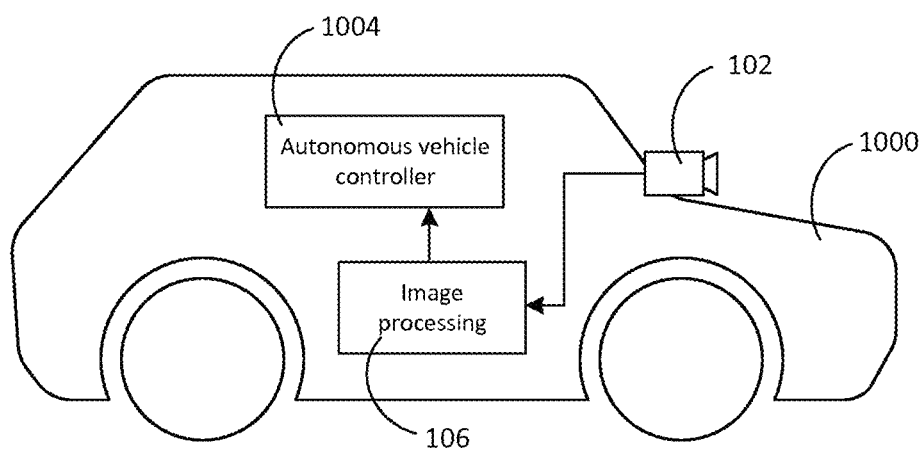
FIG. 10 shows a highly schematic block diagram of an autonomous vehicle.

FIG. 10 shows a highly-schematic block diagram of an autonomous vehicle 1000, which is shown to comprise an image processing system 106, having an input connected to at least one stereo image capture system 102 of the vehicle's sensor system and an output connected to an autonomous vehicle control system (controller) 1004. In use, the image processing system 106 of the autonomous vehicle 100 processes images captured by the image capture system 102, in real time, and the autonomous vehicle controller 1004 controls the speed and direction of the vehicle based on the results, with no or limited input from any human. The vehicle 1000 is a car in this example, but it can be any form of vehicle. The image capture system 102 is a stereoscopic image capture system, comprising a pair of stereoscopic image capture units (c.f. 102L and 102R in FIG. 1) for capturing stereoscopic image pairs. Various image processing functions can be performed by the image processing system 106, such as visual structure detection and spatial depth extraction.

$R^3SGM$ may be implemented within the image processing system 106, in order to provide fast and robust spatial depth detection within the autonomous vehicle 100. In this context, the depth information extracted from stereoscopic image pairs captured by the image capture device 102 is used by the control system 1004 as a basis for autonomous decision making, in conjunction with other image processing such as visual structure detection (e.g. detection of roads, objects etc.).

Although only one image capture system 102 is shown in Figure A, the autonomous vehicle could comprise multiple such devices, e.g. forward-facing and rear-facing stereo image capture systems.

The control system 1004 can control various subsystems of the vehicle based on the decisions it makes, including the engine and wheels via a suitable drive mechanism.

REFERENCES

[10] S. K. Gehrig, F. Eberli, and T. Meyer. A Real-Time Low-Power Stereo Vision Engine Using Semi-Global Matching. In *ICVS*, pages 134-143, 2009.

[15] D. Hernandez-Juarez, A. Chacon, A. Espinosa, D. Vazquez, J. C. Moure, and A. M. Lopez. Embedded real-time stereo estimation via Semi-Global Matching on the GPU. *Procedia Computer Science*, 80:143-153, 2016.

[24] A. Kuzmin, D. Mikushin, and V. Lempitsky. End-to-end Learning of Cost-Volume Aggregation for Real-time Dense Stereo. In *MLSP*, pages 1-6, 2017.

[29] M. Menze and A. Geiger. Object Scene Flow for Autonomous Vehicles. In *CVPR*, pages 3061-3070, 2015.

[30] M. Menze, C. Heipke, and A. Geiger. Joint 3D Estimation of Vehicles and Scene Flow. *ISPRS Annals of the Photogrammetry, Remote Sensing and Spatial Information Sciences*, 2:427, 2015

[34] S. Perri, F. Frustaci, F. Spagnolo, and P. Corsonello. vision architecture for heterogeneous systems-on-chip. *Journal of Real-Time Image Processing*, pages 1-23, 2018.

[39] D. Scharstein and R. Szeliski. A Taxonomy and Evaluation of Dense Two-Frame Stereo Correspondence Algorithms. IJCV, 47(1-3):7-42, 2002.

[40] Scharstein and R. Szeliski. High-Accuracy Stereo Depth Maps Using Structured Light. In CVPR, 2003. 6,7,8

[42] Y. Shan, Y. Hao, W. Wang, Y. Wang, X. Chen, H. Yang, and W. Luk. Hardware Acceleration for an Accurate Stereo Vision System Using Mini-Census Adaptive Support Region. ACM Transactions on Embedded Computing Systems (TECS), 13(4s), 2014. 2, 7, 8

[46] C. Ttofis and T. Theocharides. Towards Accurate Hardware Stereo Correspondence: A Real-Time FPGA Implementation of a Segmentation-Based Adaptive Support Weight Algorithm. In Design, Automation & Test in Europe Conference & Exhibition (DATE), 2012, pages 703-708, 2012

[50] L. Zhang, K. Zhang, T. S. Chang, G. Lafruit, G. K. Kuzmanov, and D. Verkest. Real-Time High-Definition Stereo Matching on FPGA. *Proceedings of the 19th ACM/SIGDA International Symposium on Field Programmable Gate Arrays*, pages 55-64, 2011.

The invention claimed is:

1. A method of extracting depth information from a stereoscopic image pair, the method comprising implementing, by an image processing system, the following:

receiving at the image processing system the stereoscopic image pair, formed of a target image and an associated reference image; and for each pixel of the target image, computing a final disparity cost vector having cost components corresponding to different disparities, storing the final disparity cost vector in association with that pixel, and assigning to that pixel a disparity corresponding to a lowest cost component of the final disparity cost vector, wherein the extracted depth information comprises the disparities assigned to the pixels of the target image;

wherein, for at least a subset of the pixels of the target image, the final disparity cost vector is computed for each of those pixels by computing, with respect to the reference image, a set of matching costs for that pixel and the different disparities, and combining the matching costs with the one or more final disparity cost vectors stored in association with one or more adjacent pixels of the target image, wherein each cost component $L(p, d)$ of a final disparity cost vector for pixel p is computed as:

$$L(p, d) = C_p(d) + \frac{1}{|X|} \sum_{x \in X} \left( \min_{d' \in \mathcal{D}} (L(p-x, d') + V(d, d')) - \min_{d' \in \mathcal{D}} (L(p-x, d')) \right)$$

in which p−x means the pixel adjacent pixel p in the target image for direction x∈X, L(p−x, d) means the cost component for disparity d of the final disparity cost vector for pixel p−x, V(d, d') is a penalty term that selectively penalizes changes in disparity, D is a set of possible disparities and X is a set of one or more direction vectors.

2. A method according to claim 1, wherein the pixels of the target image are received at the image processing system as a stream of target image pixels, and the final disparity cost vector is computed for each of the pixels independently of the final disparity cost vector of any subsequent pixel in the stream of target image pixels.

3. A method according to claim 2, wherein the final disparity cost vector is computed for each of the subset of pixels from the final disparity cost vectors computed for all of the adjacent pixels that precede that pixel in the stream of target image pixels.

4. A method according to claim 2, wherein, as the streams of pixels are received, the final disparity cost vectors are computed and the disparities are assigned to the pixels of the target image dynamically, so as to provide the assigned disparities in an output stream that is outputted from the image processing system as the streams of pixels are still being received thereat.

5. A method according to claim 3, wherein the final disparity cost vectors for all of the pixels which precede the pixel in the stream of target image pixels are aggregated and combined with the matching costs for that pixel.

6. A method according to claim 1, wherein X is chosen such that the summation $\Sigma_{x \in X}(\bullet)$ is over all adjacent pixels which precede p in the stream of target image pixels.

7. A method according to claim 1, wherein the final disparity cost vector is computed for a current pixel of the subset of pixels from the final disparity cost vector for at least one pixel adjacent the current pixel in an adjacent scan line of the target image, the final disparity cost vector for that adjacent pixel being accessed from a window buffer in which it is stored, and wherein the window buffer is in the form of a set of registers or flip-flops or one or more look up tables (LUTs).

8. A method according to claim 7, wherein the final disparity cost vectors for pixels between the current pixel and the adjacent pixel in the adjacent scan line are stored in a line buffer, and once the final disparity cost vector for the current pixel has been computed:
one of the final disparity cost vectors in the line buffer is moved to the window buffer for use in computing the final disparity cost vector for the next pixel in the subset of pixels, and
the final disparity cost vector for the current pixel is stored in the line buffer.

9. A method according to claim 8, wherein the line buffer is a dual-port memory block, wherein said one of the final disparity cost vectors is moved using one of the ports, and the final disparity cost vector for the current pixel is stored in the line buffer using the other port, and wherein the memory block comprises random access memory (RAM).

10. A method according to claim 8, wherein the final disparity cost vector is computed from the final disparity cost vectors for multiple pixels adjacent the current pixel in the adjacent scan line, which are accessed from the window buffer in which they are stored, said one of the final disparity cost vectors being moved to the window buffer once the final disparity cost vector for the current pixel has been computed.

11. A method according to claim 7, wherein the final disparity cost vector for the current pixel is computed from the final disparity cost vector of at least one adjacent pixel in the same scan line, which is accessed from the window buffer in which it is stored, and wherein once the final disparity cost vector for the current pixel has been computed, a copy is also stored in the window buffer for use in computing the final disparity cost vector for the next pixel in the subset of pixels.

12. A method according to claim 11, wherein the window buffer comprises a set of three shifting buffers for storing the final disparity cost vectors of three adjacent pixels in the adjacent scan line, and an additional buffer for storing the final disparity cost vector of the adjacent pixel in the same scan line.

13. A method according to claim 7, wherein the set of matching costs is computed for the current pixel by computing a feature vector for the current pixel and comparing it with a set of pixel feature vectors for the reference image, held in a feature vector buffer, for the pixels of the reference image having the different disparities relative to the current pixel of the target image, wherein once the final disparity cost vector has been computed for the current pixel:
a feature vector for the next pixel of the target image is computed,
the feature vector for the pixel of the reference image having a disparity greater than the maximum of the disparities relative to the next pixel is discarded from the feature vector buffer, and
a feature vector for the pixel of the reference image having a minimum of the disparities relative to the next pixel of the target image is computed and stored in the feature vector buffer, for use in computing the set of matching costs for the next pixel in the target image.

14. A method according to claim 13, wherein the minimum disparity is zero disparity.

15. A method according to claim 1, wherein:

$$V(d, d') = \begin{cases} 0 & \text{if } d = d' \\ P_1 & \text{if } |d - d'| = 1 \\ P_2 & \text{otherwise} \end{cases},$$

where $P_1$ and $P_2$ are respective first and second penalties.

16. A method according to claim 15, wherein $$\min_{d' \in \mathcal{D}} (L(p-x, d') + V(d, d'))$$

is computed for each disparity $d \in D$ as $$\min\{L(p-x, d), L(p-x, d-1) + P_1, L(p-x, d+1) + P_1,$$
$$\min_{d' \in \mathcal{D}} (L(p-x, d') + P_2)\} - \min_{d' \in \mathcal{D}} (L(p-x, d')),$$

wherein
$\min_{d' \in D}(L(p-x, d'))$
is computed once and stored for use in computing $$\min_{d' \in \mathcal{D}} (L(p-x, d') + V(d, d'))$$

for each disparity $d \in D$.

17. An image processing system comprising:
an image input configured to receive a stereoscopic image pair, formed of a target image and an associated reference image, and an image processing apparatus configured to, for each pixel of the target image, compute a final disparity cost vector having cost components corresponding to different disparities, store the final disparity cost vector in association with that pixel, and assign to that pixel a disparity corresponding to a lowest cost component of the final disparity cost vector, wherein the image processing apparatus is further configured to extract depth information from the stereoscopic image pair, wherein the extracted depth information comprises the disparities assigned to the pixels of the target image;

wherein, for at least a subset of the pixels of the target image, the final disparity cost vector is computed for each of those pixels by computing, with respect to the reference image, a set of matching costs for that pixel and the different disparities, and combining the matching costs with the one or more final disparity cost vectors stored in association with one or more adjacent pixels of the target image, wherein each cost component L(p, d) of a final disparity cost vector for pixel p is computed as:

$$L(p, d) = C_p(d) + \frac{1}{|X|}\sum_{x \in X}\left(\min_{d' \in \mathcal{D}}(L(p-x, d') + V(d, d')) - \min_{d' \in \mathcal{D}}(L(p-x, d'))\right)$$

in which p−x means the pixel adjacent pixel p in the target image for direction x∈X, L(p−x, d) means the cost component for disparity d of the final disparity cost vector for pixel p−x, V(d, d') is a penalty term that selectively penalizes changes in disparity, D is a set of possible disparities and X is a set of one or more direction vectors.

18. An image processing system according to claim 17, wherein the image processing apparatus is in the form of a field programmable gate array.

19. A computer program product comprising executable instructions stored on a non-transitory computer readable storage medium and configured, when executed on an image processing apparatus, to extract depth information from a stereoscopic image pair formed of a target image and an associated reference image by:

for each pixel of the target image, computing a final disparity cost vector having cost components corresponding to different disparities, storing the final disparity cost vector in association with that pixel, and assigning to that pixel a disparity corresponding to a lowest cost component of the final disparity cost vector, wherein the extracted depth information comprises the disparities assigned to the pixels of the target image;

wherein, for at least a subset of the pixels of the target image, the final disparity cost vector is computed for each of those pixels by computing, with respect to the reference image, a set of matching costs for that pixel and the different disparities, and combining the matching costs with the one or more final disparity cost vectors stored in association with one or more adjacent pixels of the target image, wherein each cost component L(p, d) of a final disparity cost vector for pixel p is computed as:

$$L(p, d) = C_p(d) + \frac{1}{|X|}\sum_{x \in X}\left(\min_{d' \in \mathcal{D}}(L(p-x, d') + V(d, d')) - \min_{d' \in \mathcal{D}}(L(p-x, d'))\right)$$

in which p−x means the pixel adjacent pixel p in the target image for direction x∈X, L(p−x, d) means the cost component for disparity d of the final disparity cost vector for pixel p−x, V(d, d') is a penalty term that selectively penalizes changes in disparity, D is a set of possible disparities and X is a set of one or more direction vectors.

* * * * *